US008717345B2

(12) United States Patent
Bae et al.

(10) Patent No.: US 8,717,345 B2
(45) Date of Patent: May 6, 2014

(54) PRE-CHARGING OF SUB-PIXELS

(75) Inventors: Hopil Bae, Sunnyvale, CA (US); Marduke Yousefpor, San Jose, CA (US); Zhibing Ge, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 433 days.

(21) Appl. No.: 13/143,188

(22) PCT Filed: May 24, 2011

(86) PCT No.: PCT/US2011/037812
§ 371 (c)(1), (2), (4) Date: Jul. 1, 2011

(87) PCT Pub. No.: WO2012/161705
PCT Pub. Date: Nov. 29, 2012

(65) Prior Publication Data
US 2012/0299894 A1 Nov. 29, 2012

(51) Int. Cl.
*G06F 3/038* (2013.01)

(52) U.S. Cl.
USPC .......... 345/210

(58) Field of Classification Search
CPC .......... G09G 3/3614
USPC .......... 345/87–104, 204–215
See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |

(Continued)

FOREIGN PATENT DOCUMENTS

| | | | |
|---|---|---|---|
| JP | 2000-163031 | A | 6/2000 |
| JP | 2002-342033 | A | 11/2002 |
| WO | WO-2012/161705 | A1 | 11/2012 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Joseph Feild
*Assistant Examiner* — Gustavo Polo
(74) *Attorney, Agent, or Firm* — Morrison & Foerster LLP

(57) ABSTRACT

Pre-charging display screen sub-pixels, such as aggressor sub-pixels, prior to the application of a target data voltage to the aggressor sub-pixels is provided. In some examples, a target voltage of a sub-pixel in a previous row in the scanning order of the display can be used to pre-charge sub-pixels. The row of sub-pixels to be pre-charged can be switched on during the updating of another row of sub-pixels. In this way, for example, target voltages applied to data lines while an update row is connected to the data lines, e.g., to update the update row, can be applied to the row to be pre-charged as well.

22 Claims, 14 Drawing Sheets

(56) References Cited

U.S. PATENT DOCUMENTS

| | | | |
|---|---|---|---|
| 2005/0231455 | A1 | 10/2005 | Moon |
| 2006/0026521 | A1 | 2/2006 | Hotelling et al. |
| 2006/0197753 | A1 | 9/2006 | Hotelling |
| 2007/0268231 | A1 | 11/2007 | Kang et al. |
| 2010/0195004 | A1 | 8/2010 | Hotelling |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report mailed Feb. 9, 2012, for PCT Application No. PCT/US2011/037812, filed May 24, 2011, three pages.

PRE-CHARGING OF SUB-PIXELS

This application is a United States National Stage Application under 35 U.S.C. §371 of International Patent Application No. PCT/US2011/037812, filed May 24, 2011, which is incorporated by reference in its entirety for all purposes.

FIELD OF THE DISCLOSURE

This relates generally to pre-charging sub-pixels of a display, and more particularly, to pre-charging the pixel electrodes of the sub-pixels.

BACKGROUND OF THE DISCLOSURE

Display screens of various types of technologies, such as liquid crystal displays (LCDs), organic light emitting diode (OLED) displays, etc., can be used as screens or displays for a wide variety of electronic devices, including such consumer electronics as televisions, computers, and handheld devices (e.g., cellular telephones, audio and video players, gaming systems, and so forth). LCD devices, for example, typically provide a flat display in a relatively thin package that is suitable for use in a variety of electronic goods. In addition, LCD devices typically use less power than comparable display technologies, making them suitable for use in battery-powered devices or in other contexts where it is desirable to minimize power usage.

LCD devices typically include multiple picture elements (pixels) arranged in a matrix. The pixels may be driven by scanning line and data line circuitry to display an image on the display that can be periodically refreshed over multiple image frames such that a continuous image may be perceived by a user. Individual pixels of an LCD device can permit a variable amount light from a backlight to pass through the pixel based on the strength of an electric field applied to the liquid crystal material of the pixel. The electric field can be generated by a difference in potential of two electrodes, a common electrode and a pixel electrode. In some LCDs, such as electrically-controlled birefringence (ECB) LCDs, the liquid crystal can be in between the two electrodes. In other LCDs, such as in-plane switching (IPS) and fringe-field switching (FFS) LCDs, the two electrodes can be positioned on the same side of the liquid crystal. In many displays, the direction of the electric field generated by the two electrodes can be reversed periodically. For example, LCD displays can scan the pixels using various inversion schemes, in which the polarities of the voltages applied to the common electrodes and the pixel electrodes can be periodically switched, i.e., from positive to negative, or from negative to positive. As a result, the polarities of the voltages applied to various lines in a display panel, such as data lines used to charge the pixel electrodes to a target voltage, can be periodically switched according to the particular inversion scheme.

SUMMARY

The following description includes examples of pre-charging sub-pixels, such as aggressor sub-pixels, prior to the application of a target data voltage to the aggressor sub-pixels. In some embodiments, a target voltage of a sub-pixel in a previous row in the scanning order of the display can be used to pre-charge sub-pixels. The row of sub-pixels to be pre-charged can be switched on during the updating of another row of sub-pixels. In this way, for example, target voltages applied to data lines while an update row is connected to the data lines, e.g., to update the update row, can be applied to the row to be pre-charged as well.

DETAILED DESCRIPTION

In the following description of example embodiments, reference is made to the accompanying drawings which form a part hereof, and in which it is shown by way of illustration specific embodiments in which embodiments of the disclosure can be practiced. It is to be understood that other embodiments can be used and structural changes can be made without departing from the scope of the embodiments of this disclosure.

The following description includes examples of pre-charging sub-pixels, such as aggressor sub-pixels, prior to the application of a target data voltage to the aggressor sub-pixels. In some embodiments, a target voltage of a sub-pixel in a previous row in the scanning order of the display can be used to pre-charge sub-pixels. The row of sub-pixels to be pre-charged can be switched on during the updating of another row of sub-pixels. In this way, for example, target voltages applied to data lines while an update row is connected to the data lines, e.g., to update the update row, can be applied to the row to be pre-charged as well.

Figure 1A:
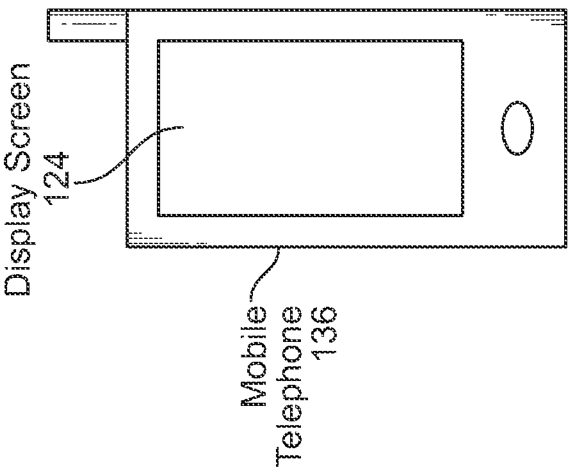
FIGS. 1A-1D illustrate an example mobile telephone, an example media player, an example personal computer, and an example display that each include an example display screen that can be scanned according to embodiments of the disclosure.
Figure 1B:
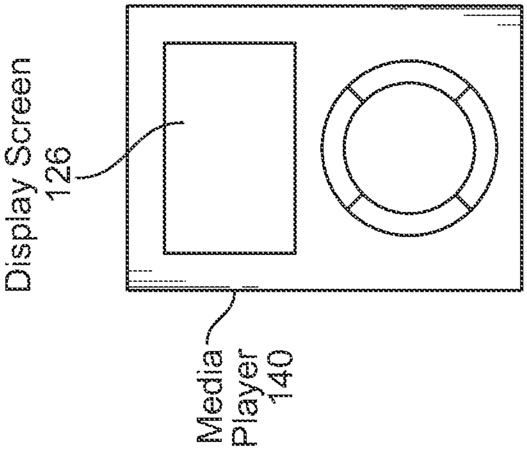
Figure 1C:
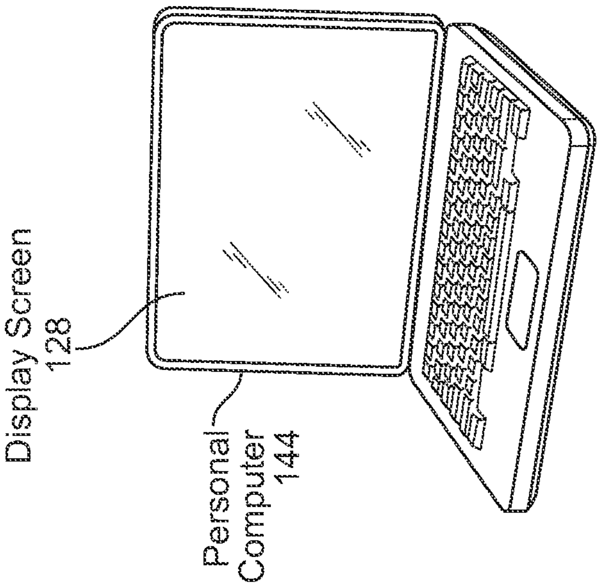
Figure 1D:
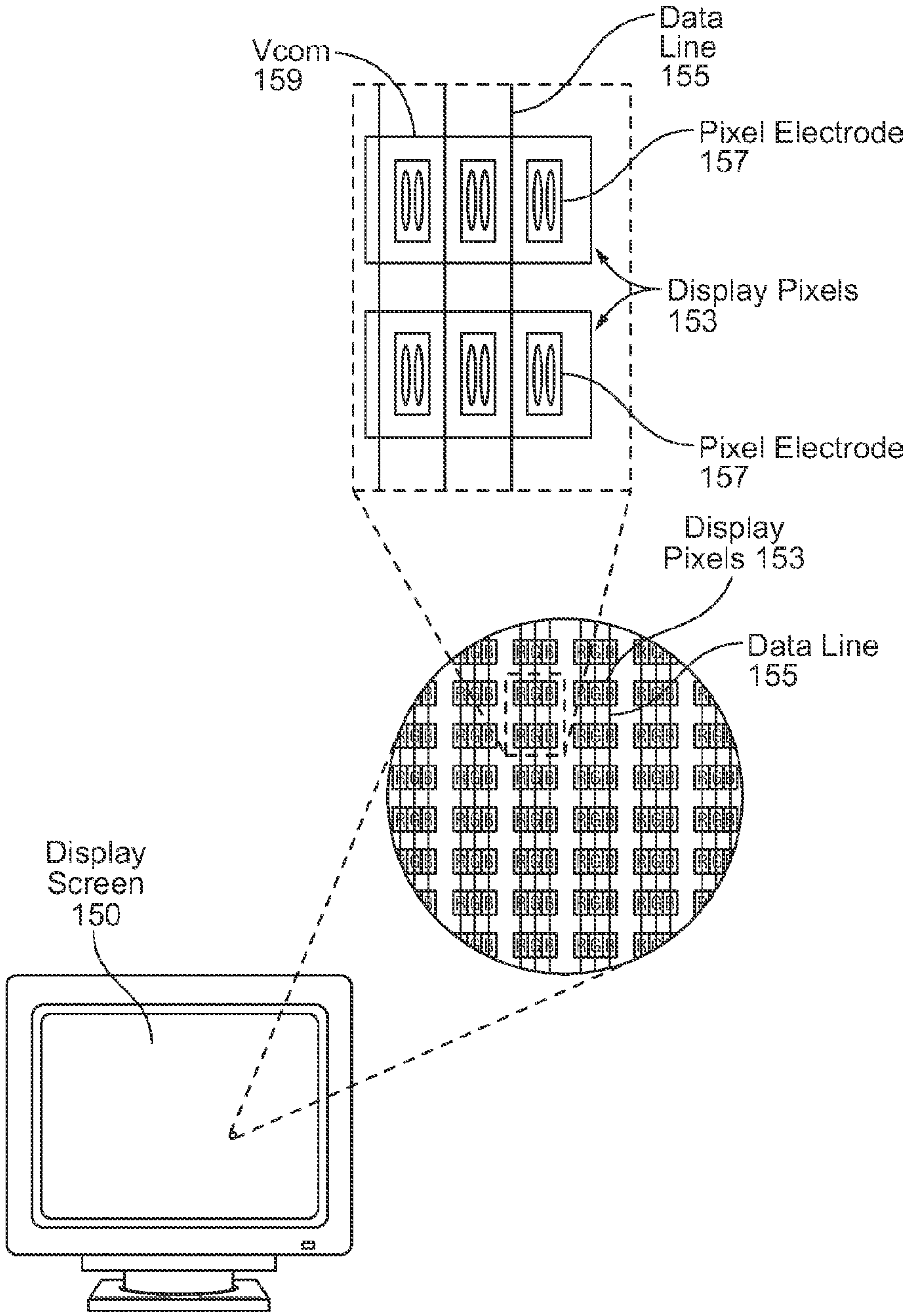

FIGS. 1A-1D show example systems that can include display screens that can be scanned according to embodiments of the disclosure. FIG. 1A illustrates an example mobile telephone 136 that includes a display screen 124. FIG. 1B illustrates an example digital media player 140 that includes a display screen 126. FIG. 1C illustrates an example personal computer 144 that includes a display screen 128. FIG. 1D illustrates an example display screen 150, such as a stand-alone display. In some embodiments, display screens 124, 126, 128, and 150 can be touch screens that include touch sensing circuitry. In some embodiments, touch sensing circuitry can be integrated into the display pixels.

FIG. 1D illustrates some details of example display screen 150. FIG. 1D includes a magnified view of display screen 150 that shows multiple display pixels 153, each of which can include multiple display sub-pixels, such as red (R), green (G), and blue (B) sub-pixels in an RGB display. Although various embodiments are described with respect to display pixels, one skilled in the art would understand that the term display pixels (or simply "pixels") can be used interchangeably with the term display sub-pixels (or simply "sub-pixels") in embodiments in which display pixels include multiple sub-pixels. For example, some embodiments directed to RGB displays can include display pixels divided into red, green, and blue sub-pixels. In other words, each sub-pixel can be a red (R), green (G), or blue (B) sub-pixel, with the combination of all three R, G, and B sub-pixels forming one display pixel.

Data lines 155 can run vertically through display screen 150, such that each display pixel in a column of display pixels can include a set 156 of three data lines (an R data line, a G data line, and a B data line) corresponding to the three sub-pixels of each display pixel. In some embodiments, the three data lines in each display pixel can be operated sequentially. For example, a display driver can multiplex an R data voltage, a G data voltage, and a B data voltage onto a single bus line, and then a demultiplexer in the border region of the display can demultiplex the R, G, and B data voltages to apply the data voltages to the corresponding data lines in the particular sequence.

FIG. 1D also includes a magnified view of two of the display pixels 153, which illustrates that each display pixel can include pixel electrodes 157, each of which can correspond to one of the sub-pixels, for example. Each display pixel can include a common electrode (Vcom) 159 that can be used in conjunction with pixel electrodes 157 to create an electrical potential across a pixel material (not shown). Varying the electrical potential across the pixel material can correspondingly vary an amount of light emanating from the sub-pixel. In some embodiments, for example, the pixel material can be liquid crystal. A common electrode voltage can be applied to a Vcom 159 of a display pixel, and a data voltage can be applied to a pixel electrode 157 of a sub-pixel of the display pixel through the corresponding data line 155. A voltage difference between the common electrode voltage applied to Vcom 159 and the data voltage applied to pixel electrode 157 can create the electrical potential across the liquid crystal of the sub-pixel. The electrical potential between Vcom 159 and pixel electrode 157 can generate an electric field through the liquid crystal, which can cause inclination of the liquid crystal molecules to allow polarized light from a backlight (not shown) to emanate from the sub-pixel with a luminance that depends on the strength of the electric field (which can depend on the voltage difference between the applied common electrode voltage and data voltage). In other embodiments, the pixel material can include, for example, a light-emitting material, such as can be used in organic light emitting diode (OLED) displays.

In some scanning methods, the direction of the electric field across the pixel material can be reversed periodically. In LCD displays, for example, periodically switching the direction of the electric field can help prevent the molecules of liquid crystal from becoming stuck in one direction. Switching the electric field direction can be accomplished by reversing the polarity of the electrical potential between the pixel electrode and the Vcom. In other words, a positive potential from the pixel electrode to the Vcom can generate an electric field across the liquid crystal in one direction, and a negative potential from the pixel electrode to the Vcom can generate an electric field across the liquid crystal in the opposite direction. In some scanning methods, switching the polarity of the potential between the pixel electrode and the Vcom can be accomplished by switching the polarities of the voltages applied to the pixel electrode and the Vcom. For example, during an update of an image in one frame, a positive voltage can be applied to the pixel electrode and a negative voltage can be applied to the Vcom. In a next frame, a negative voltage can be applied to the pixel electrode and a positive voltage can be applied to the Vcom.

The brightness (or luminance) of the corresponding pixel or sub-pixel depends on the magnitude of the difference between the pixel electrode voltage and the Vcom voltage. For example, the magnitude of the difference between a pixel electrode voltage of +2V and a Vcom voltage of −3V is 5V. Likewise, the magnitude of the difference between a pixel electrode voltage of −2V and a Vcom voltage of +3V is also 5V. Therefore, in this example, switching the polarities of the pixel electrode and Vcom voltages from one frame to the next would not change the brightness of the pixel or sub-pixel.

Various inversion schemes can be used to periodically switch the polarities of the pixel electrodes and the Vcoms. In a single line inversion scheme, for example, when the scanning of a first frame is completed, the location of the positive and negative polarities on the pixel electrodes can be in a pattern of rows of the display that alternates every single row, e.g., the first row at the top of the display screen having positive polarities, the second row from the top having negative polarities, the third row from the top having positive polarities, etc. In a subsequent frame, such as the second frame, the pattern of voltage polarities can be reversed, e.g., the first row with negative polarities, the second row with positive polarities, etc.

During the scanning operation in single line inversion, the rows can be updated in a scanning order that is the same as the order of the position of the rows from a first row at the top of the display screen to a last row at the bottom of the display screen. For example, the first row at the top of the display can be updated first, then the second row from the top can be updated second, then the third row from the top can be updated third, etc. In this way, there can be a repeating timing pattern of voltage polarity swings on the data lines during the scanning operation. In other words, repeatedly switching the voltages on the data lines from positive to negative to positive to negative, etc., during the scanning operation results in a repeating timing pattern of positive and negative voltage swings. In single line inversion, for example, there is one positive voltage swing after one row is updated, and one negative voltage swing after the next row in the scanning order is updated. Thus, the timing pattern of positive/negative voltage swings repeats after the updating of each block of two adjacent rows in single line inversion.

In some line inversion schemes, the location of the positive and negative polarities on the pixel electrodes can be in a pattern of rows of the display that alternates every two rows (for 2-line inversion), every three rows (for 3-line inversion), every four rows (for 4-line inversion), etc. In a 2-line inversion scheme, for example, when the scanning of a first frame is completed, the location of the positive and negative polarities on the pixel electrodes can be in a pattern of rows of the display that alternates every two rows, e.g., the first and second rows at the top of the display screen having positive polarities, the third and fourth rows from the top having negative polarities, the fifth and sixth rows from the top having positive polarities, etc. In a subsequent frame, such as the second frame, the pattern of voltage polarities can be reversed, e.g., the first and second rows with negative polarities, the third and fourth rows with positive polarities, etc. In general, the location of positive and negative polarities on the pixel electrodes in an M-line inversion scheme can alternate every M rows.

Voltage swings on the data lines in an M-line inversion scheme can repeat every 2M rows. In other words, there is one positive voltage swing after M rows are updated, and one negative voltage swing after the next M rows in the scanning order are updated. Thus, the timing pattern of positive/negative voltage swings repeats after the updating of each block of 2M adjacent rows in M-line inversion.

In a reordered M-line inversion scheme, the location resulting pattern of alternating positive and negative polarities on the pixel electrodes can be the same pattern as in regular single line inversion described above, i.e., alternating polarity every single row. However, while the regular line inversion schemes described above can update the rows in the sequential order of row position, in a reordered line inversion scheme, the rows can be updated in an order that is not sequential. In one example reordered 4-line inversion scheme, the scanning order can update four rows in a block of eight rows with positive polarity and update the other four rows in the block with negative polarity. However, unlike regular 4-line inversion, the scanning order of reordered 4-line inversion can update, for example, update rows 1, 3, 5, and 7 with positive polarity voltages, and then update rows 2, 4, 6, and 8 with negative polarity voltages. Therefore, in this example reordered 4-line inversion scheme, the timing pattern of positive/negative voltage swings can repeat after the updating of 8 rows (similar to regular 4-line inversion), but the pattern of the location of alternating positive and negative pixel electrodes can repeat every single row (similar to regular single line inversion). In this way, for example, reordered line inversion schemes can reduce the number of voltage polarity swings on the data lines during the scanning of a single frame, while maintaining an alternating row-by-row location of alternating polarities.

Thus, the particular order and location in which voltages of different polarities are applied to the pixel electrodes of sub-pixels of a display can depend on the particular inversion scheme being used to scan the display.

As will be described in more detail below with respect to various example embodiments, applying a voltage to a sub-pixel in one row of pixels can affect the voltages of sub-pixels in other rows of pixels. For example, a capacitance that can exist between pixel electrodes can allow a large voltage swing (for example, from a positive polarity voltage to a negative polarity voltage, or vice-versa) on the pixel electrode of one sub-pixel (which may be referred to herein as an "aggressor sub-pixel," or simply an "aggressor pixel") to be coupled into a pixel electrode in an adjacent row, which can result in a change in the voltage of the pixel electrode in the adjacent row. The change in the voltage of the pixel electrode in the adjacent row can cause an erroneous increase or decrease in the brightness of the sub-pixel (which may be referred to herein as a "victim sub-pixel," or simply a "victim pixel") with the affected pixel electrode. In some cases, the erroneous increase or decrease in victim pixel brightness can be detectable as a visual artifact in the displayed image. As will be apparent from the description below, aggressor sub-pixels can also be victim sub-pixels, and vice-versa.

Figure 2:
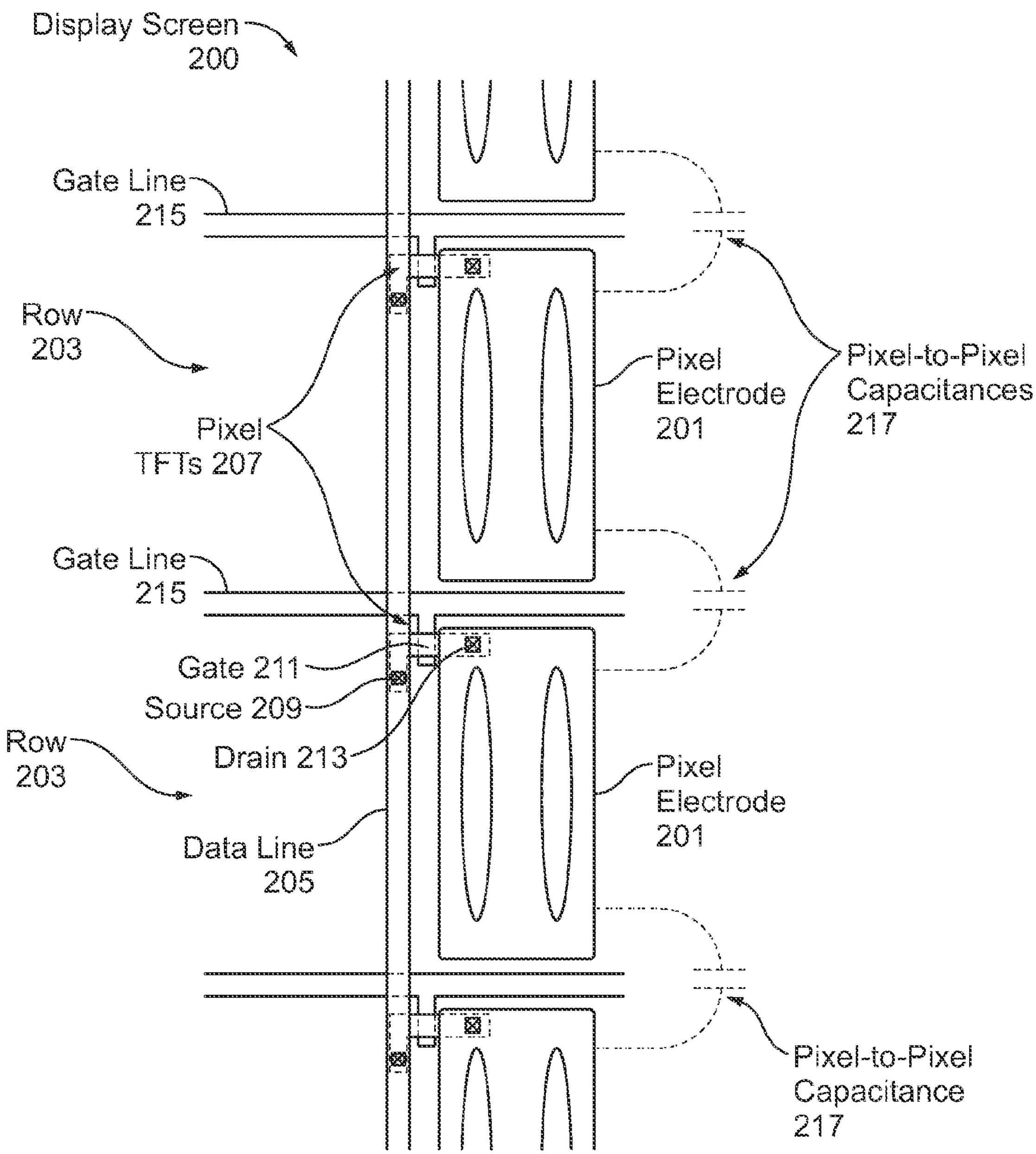
FIG. 2 illustrates an example arrangement of pixel electrodes in an example display screen.

FIG. 2 illustrates an example arrangement of pixel electrodes 201 in an example display screen 200. Pixel electrodes 201 can have an arrangement similar to pixel electrodes 157 in FIG. 1D, for example, in which the pixel electrodes can be arranged in horizontal lines, such as rows 203. For the purpose of clarity, other pixel electrodes in rows 203 of display screen 200 are not shown in this figure. Pixel electrodes 201 shown in FIG. 2 can each be associated with a data line 205, such as data line 155 in FIG. 1D. Each pixel TFT 207 can include a source 209 connected to data line 205, a gate 211, and a drain 213 connected to pixel electrode 201. Each pixel TFT 207 in one row 203 of pixels can be switched on by applying an appropriate gate line voltage to a gate line 215 corresponding to the row. During a scanning operation of display screen 200, a target voltage of each pixel electrode 201 in one row 203 can be applied individually to the pixel electrode by switching on pixel TFTs 207 of the of the row with the corresponding gate line 215 while the target voltages of each pixel electrode in the row are being applied to data lines 205.

To update all of the pixel electrodes 201 in display screen 200, thus refreshing an image frame displayed by the sub-pixels of the display screen, rows 203 can be scanned by applying the appropriate gate line voltages to gate lines 215 in a particular scanning order. For example, a scanning order can be sequential in order of position of rows 203 from a first row at the top of display screen 200 to a last row at the bottom of the display screen. In other words, the first row of the display can be scanned first, then the next adjacent row (i.e., the second row) can be scanned next, then the next adjacent row (i.e., the third row) can be scanned, etc. One skilled in the art would understand that other scanning orders can be used.

When a particular row 203 is being scanned to update the voltages on pixel electrodes 201 of the row with the target data voltages being applied to the data lines 205 during the scanning of the row, pixel TFTs 207 of the other rows can be switched off so that the pixel electrodes in the rows that are not being scanned remain disconnected from the data lines. In this way, data voltages on the data lines can be applied to a single row currently being scanned, while the voltages on the data lines are not applied directly to the pixel electrodes in the other rows.

However, updating the voltages of the pixel electrodes 201 of a particular row 203 can have an affect on the voltages of pixel electrodes in other rows. For example, a pixel-to-pixel capacitance 217 existing between adjacent pixel electrodes 201, for example, can allow voltage changes in one pixel electrode to affect the voltage values of adjacent pixel electrodes through a capacitance coupling between the pixel electrodes.

Figure 3:
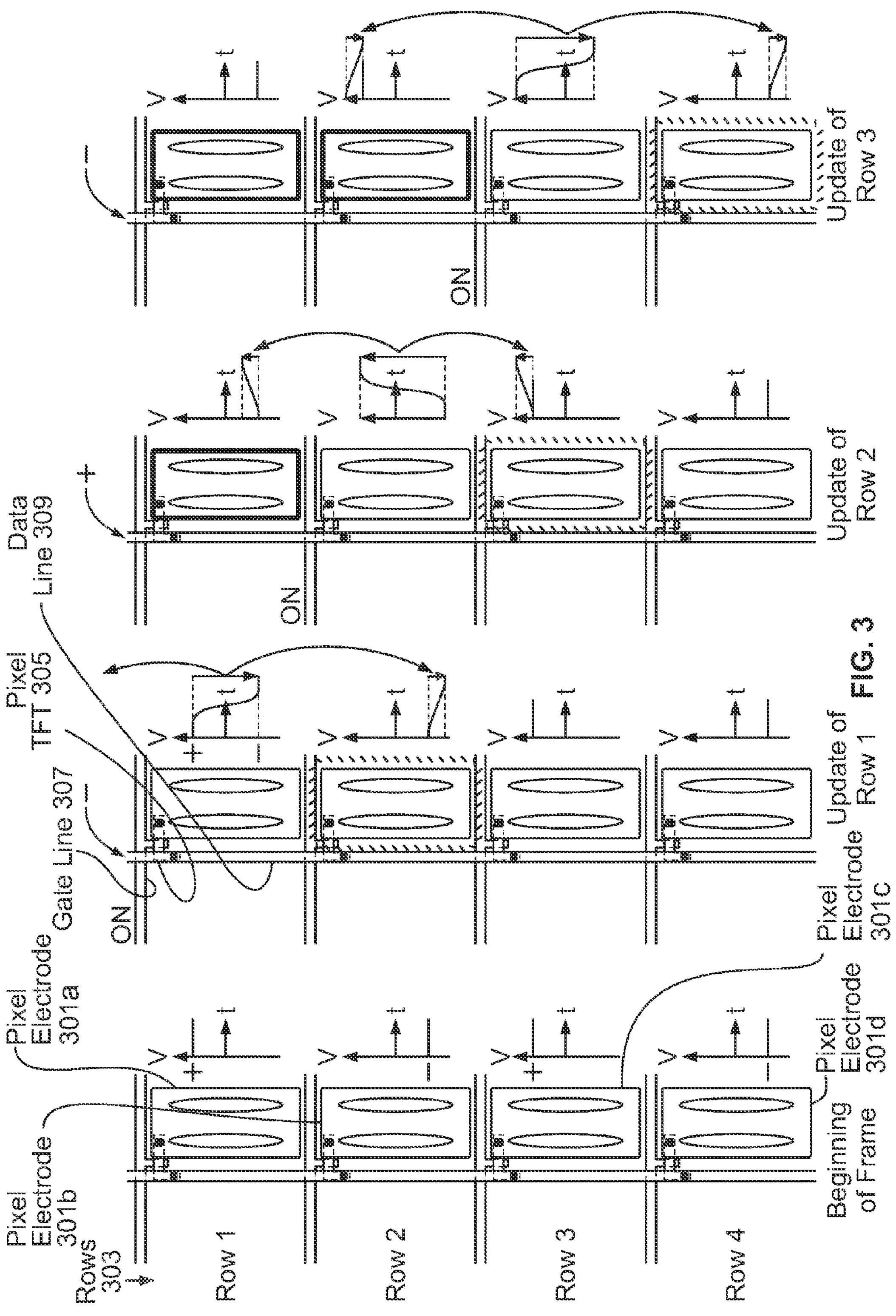
FIG. 3 illustrates an example scanning operation in which rows can be scanned in a line-by-line sequential order.

FIG. 3 illustrates an example scanning operation in which rows can be scanned in a line-by-line sequential order. The inversion scheme shown in FIG. 3 can be, for example, single line inversion (or single dot inversion). The voltages on pixel electrodes 301*a-d* of four rows 303 are represented by voltage graphs next to each pixel electrode, which show the voltage on the pixel electrode during scanning of various rows. At the beginning of the frame, pixel electrode 301*a* of row 1 can have a positive voltage, pixel electrode 301*b* of row 2 can have a negative voltage, pixel electrode 301*c* of row 3 can have a positive voltage, and pixel electrode 301*d* of row 4 can have a negative voltage. The voltages at the beginning of the frame can be, for example, the target voltages that were applied to the pixels during the previous frame. In other words, the voltages of the pixel electrodes 301*a-d* at the beginning of the frame can be the voltages used to display the image of the previous frame. In this example, the polarity of the voltages on the pixel electrodes 301*a-d* can be changed for each scan line (e.g., single line inversion or single dot inversion). FIG. 3 shows a scan of row 1, during which a pixel TFT 305 of a pixel electrode 301*a* of row 1 can be switched on by applying the appropriate gate line voltage to a gate line 307. During the scan of row 1, a negative voltage can be applied to a data line 309 to update the voltage on the pixel electrode of row 1 as shown in the voltage graph next to the pixel electrode. The voltage graph of pixel electrode 301*a* during the scan of row 1 shows a voltage swing from positive voltage to negative voltage, which is represented in the voltage graph by a large down arrow. Due to effects such as the capacitance coupling described above, for example, the large negative voltage swing of pixel electrode 301*a* can cause a corresponding negative voltage swing in adjacent pixel electrodes such as pixel electrode 301*b*. This effect on the voltages on adjacent pixel electrodes can be significantly smaller in magnitude, therefore, the voltage graph of pixel electrode 301*b* shows a slight negative change, which is represented in the voltage graph by a small down arrow, during the scan of row 1. As described above, the luminance of the sub-pixel associated with a pixel electrode can depend on the magnitude of the pixel voltage. The negative voltage change in pixel electrode 301*b* caused by the large negative voltage swing in pixel electrode 301*a* can increase the magnitude of the voltage of pixel electrode 301*b*. Therefore, the effect of the negative voltage swing on pixel electrode 301*a* can be an increase in the luminance, e.g., brightness, of the sub-pixel of pixel electrode 301*b*. The increase in brightness sub-pixel of pixel electrode 301*b* is represented in FIG. 3 by hatch marks surrounding pixel electrode 301*b*.

In the scan of row 2, pixel TFT 305 of pixel electrode 301*b* can be switched on with a gate line voltage applied to the corresponding gate line 307, while the pixel TFTs of the other rows can remain off. While pixel electrode 301*b* is connected to data line 309 during the scan of row 2, a positive target voltage can be applied to the data line to update the voltage of pixel electrode 301*b*. The voltage graph of pixel electrode 301*b* illustrates that the application of the positive voltage causes a large positive voltage swing on pixel electrode 301*b*, which is represented by the large up arrow in the voltage graph. A large positive swing in voltage on pixel electrode 301*b* can affect the voltages of adjacent pixel electrodes 301*a* and 301*c* correspondingly, resulting in relatively smaller positive changes in voltage on the two adjacent pixel electrodes. The smaller positive voltage swings in the adjacent pixel electrodes are represented in the corresponding voltage graphs by small up arrows. The positive voltage change on pixel electrode 301*a* can cause the negative voltage on the pixel electrode to be reduced in magnitude, which can result in decrease in the brightness of the sub-pixel of pixel electrode 301*a*. In other words, the brightness of the sub-pixel of pixel electrode 301*a* can be reduced such that the sub-pixel appears darker, which is represented in FIG. 3 by the thicker, dark borders shown on pixel electrode 301*a* in the scan of row 2.

The large positive voltage swing on pixel electrode 301*b* can result in an increase in the brightness of the sub-pixel of pixel electrode 301*c* because the positive change to the voltage on pixel electrode 301*c* can increase the magnitude of the voltage on pixel electrode 301*c*. The increase in brightness of pixel electrode 301*c* is represented in FIG. 3 by hatch marks surrounding pixel electrode 301*c*.

In the scan of row 2, the application of the target voltage to pixel electrode 301*b* can correct, or overwrite, the erroneous increase in brightness introduced previously. For example, in the scan of row 1, the brightness of the sub-pixel of pixel electrode 301*b* was increased, making the sub-pixel appear brighter, due to the voltage swing occurring on pixel electrode 301*a*. While this increased brightness of pixel electrode 301*b* might otherwise be visible as a display artifact, in this case, the erroneous increase in brightness can be quickly overwritten in the scan of row 2, which immediately follows the scan of row 1. In other words, in the scan of row 2, the voltage on pixel electrode 301*b* is updated to the target voltage for the sub-pixel regardless of whether the pixel electrode 301*b* is being update from a correct voltage (i.e., the target voltage from the previous frame) or updated from an incorrect voltage (e.g., an erroneously higher or lower voltage). Therefore, pixel electrode 301*b* is shown during the scan of row 2 in FIG. 3 with the hatch marks removed. In other words, the scan of row 2 can overwrite the erroneous voltage on pixel electrode 301*b* with the current target voltage.

During a scan of row 3, pixel TFT 305 corresponding to pixel electrode 301*c* can be switched on, as described above. A negative target voltage can be applied to data line 309, which can cause the voltage on pixel electrode 301*c* to swing from positive to negative as represented by the large down arrow in the voltage graph. The negative swing in voltage on pixel electrode 301*c* can cause negative voltage changes on pixel electrodes 301*b* and 301*d*, causing a decrease in the magnitude of the positive voltage on pixel electrode 301*b* and an increase in magnitude of the voltage on pixel electrode 301*d*. Thus, as before, updating the voltage on pixel electrode 301*c* can affect adjacent sub-pixels by causing the sub-pixel of pixel electrode 301*b* to appear darker and the sub-pixel of pixel electrode 301*d* to appear brighter.

Figure 4:
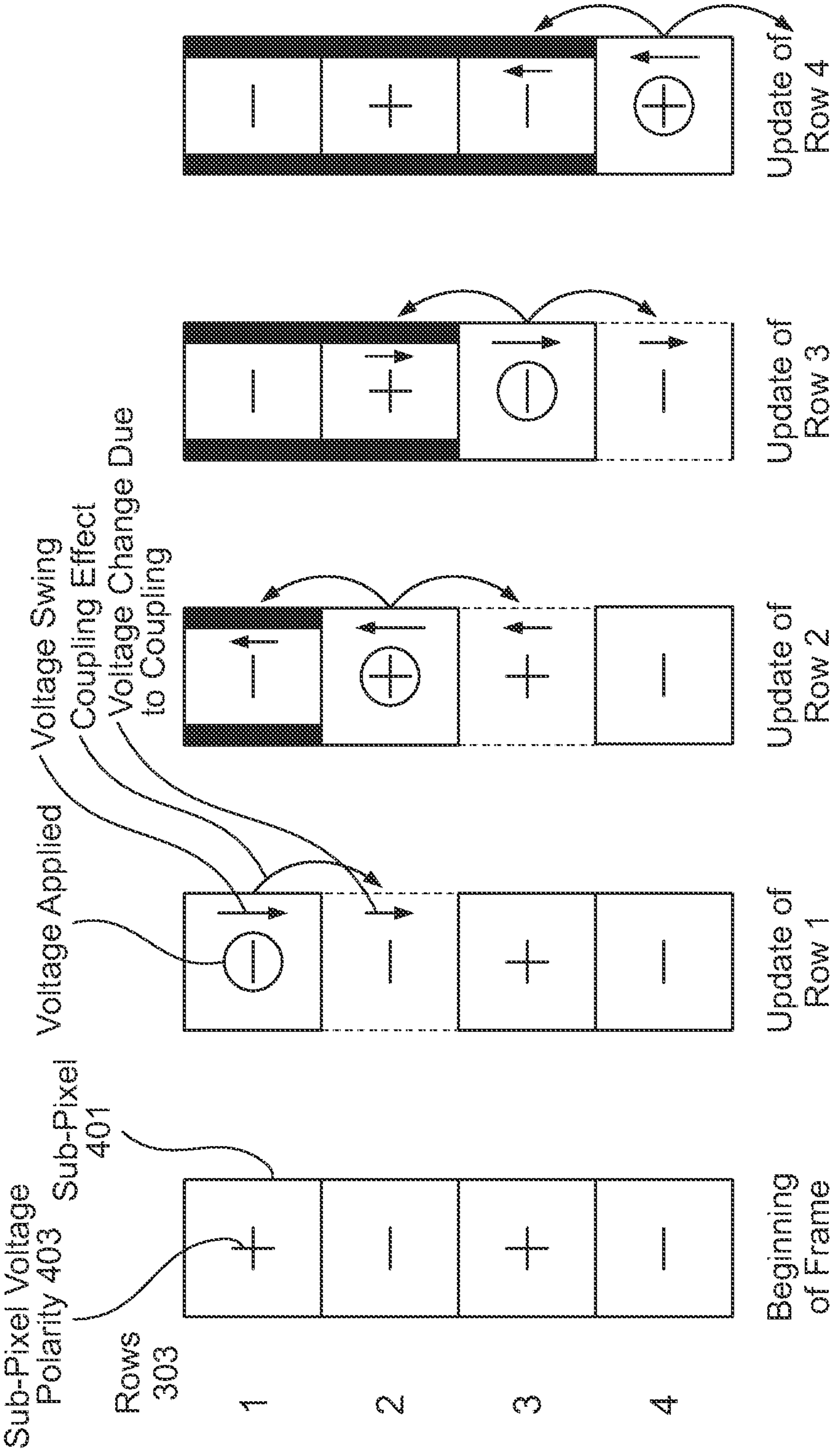
FIG. 4 shows another representation of the example scanning operation shown in FIG. 3.

FIG. 4 shows another representation of the example scanning operation shown in FIG. 3. Specifically, FIG. 4 illustrates a simplified notation for describing various effects on sub-pixel brightness that can occur during scanning operations. The notation illustrated in FIG. 4 will be adopted below in the descriptions of additional example embodiments shown in FIGS. 5, 7, and 9-11.

FIG. 4 illustrates rows 303 including sub-pixels 401 corresponding to the sub-pixels of pixel electrodes 301*a-d* of FIG. 3. Sub-pixel voltage polarities 403 associated with each sub-pixel 401 are shown in FIG. 4. The sub-pixel voltage polarities 403 correspond to the polarities of the voltages on pixel electrodes 301*a-d* shown in FIG. 3. FIG. 4 illustrates the voltage polarities 403 on the sub-pixels 401 of rows 1-4 at the beginning of the frame, corresponding to FIG. 3. As described above, during the update of row 1, a target voltage is applied to the pixel electrode (i.e., pixel electrode 301*a*) of sub-pixel 401 in row 1. The direct application of voltage to a pixel electrode is illustrated in the figures with the notation of a circle around the polarity sign of the applied voltage in the sub-pixel. A large voltage swing on a pixel electrode of a sub-pixel due to a direct application of voltage to the pixel electrode is illustrated in the figures with the notation of a large up-arrow, corresponding to a positive voltage swing, or a large down-arrow, corresponding to a negative voltage swing, in the sub-pixel.

In the update of row 1 shown in FIG. 4, for example, the negative target voltage applied to sub-pixel 401 of row 1 can cause a negative voltage swing because the sub-pixel voltage polarity 403 of the sub-pixel was positive at the beginning of the update of row 1, e.g., at the beginning of the frame. As described above, the negative voltage swing can cause a corresponding negative voltage change on sub-pixel 401 of row 2, which is illustrated in the figures with the notation of a small down-arrow (or a small up-arrow for positive voltage changes). Also as described above, the negative voltage change can cause sub-pixel 401 of row 2 to appear brighter, which is illustrated in the figures with the notation of dashed lines used for the left and right borders of the sub-pixel.

In the update of row 2 shown in FIG. 4, a positive polarity target voltage can be applied to sub-pixel 401 of row 2, which can cause a large positive voltage swing on the sub-pixel. As described above, sub-pixel 401 of row 1 can be affected by becoming darker due to the corresponding positive voltage change to the negative polarity voltage on the sub-pixel of row 1. The decrease in brightness, e.g., darker appearance, of sub-pixel 401 of row 1 is illustrated in the figures with the notation of thick, dark lines used for the left and right borders of the sub-pixel. As described above, sub-pixel 401 of row 3 can appear brighter due to the positive voltage change caused by the voltage swing on the pixel electrode (i.e., pixel electrode 301*b*) of sub-pixel 401 of row 2. Thus, the left and right borders of sub-pixel 401 of row 3 are shown as dashed lines in FIG. 4. The update of row 3 shown in FIG. 4 likewise represents the above-described update of row 3, including the application of negative polarity target voltage to sub-pixel 401 of row 3, a large negative swing on the corresponding pixel electrode, and a resulting decrease and increase in the brightness of the sub-pixels of row 2 and row 4, respectively.

FIG. 4 also illustrates the update of row 4, in which the change in polarity of sub-pixel 401 of row 4 can result in a decrease in the brightness of the preceding sub-pixel of row 3, and an increase in the brightness of the next sub-pixel of row 5 (not shown). Thus, it can be seen from FIG. 4 that the scanning of each row under the particular inversion scheme of the present example, i.e., single line inversion (or single dot inversion), can result in a decrease in brightness of the sub-pixels in preceding rows and an increase in brightness of the sub-pixels in the next rows. However, the increase in brightness of the next row can be subsequently overwritten in the next scan step, leaving only the decreases in brightness of each sub-pixel of the display.

A uniform decrease in brightness of all sub-pixels may not be detectable as a visual artifact. In other words, the particular order of scanning in some types of inversion schemes may mask the effects of pixel-to-pixel coupling on sub-pixel luminance. On the other hand, some types of inversion schemes may exacerbate visual artifacts that can result from pixel-to-pixel coupling.

Figure 5:
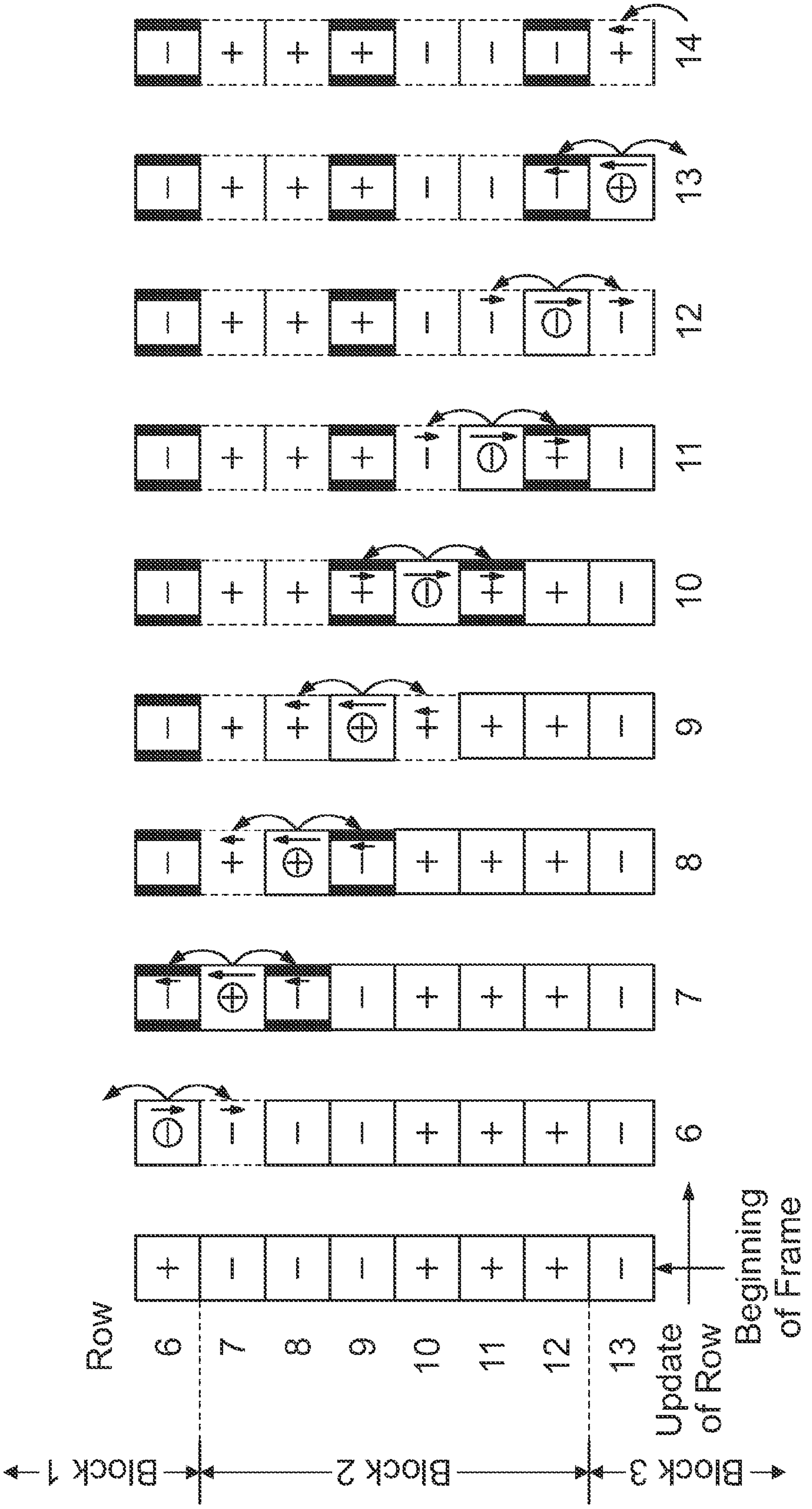
FIG. 5 illustrates an example scanning operation using a 3-line inversion scheme, or a 3-dot inversion scheme.

FIG. 5 illustrates an example scanning operation using a 3-line inversion scheme, or a 3-dot inversion scheme. FIG. 5 shows the complete scanning of a block of six rows of the 3-line inversion scheme, i.e., block 2, which includes rows 7-12. FIG. 5 also illustrates the updating of an adjacent row above block 2 (i.e., row 6), which is the last row in block 1, and the updating of an adjacent row after block 2 (i.e., row 13), which is the first row in block 3.

At the beginning of the frame, the pixel voltage polarities of the first three rows in block 2 (i.e., rows 7-9) are negative, and the last three rows in block 2 (i.e., rows 10-12) are positive (e.g., for 3-line inversion, for 3-dot inversion). Scanning of the display can begin with the update of the row 1 (not shown) of block 1, and continue until scanning reaches row 6. FIG. 5 illustrates the scanning of row 6, during which a negative voltage is applied to the pixel electrode of sub-pixel of row 6 (sometimes referred to herein simply as sub-pixel 6) to update the sub-pixel to its target voltage for the current frame. Updating sub-pixel 6 can result in a large negative swing in voltage, which can cause a corresponding negative change to the negative voltage of the sub-pixel of row 7 (i.e., sub-pixel 7), resulting in an increase in the brightness of sub-pixel 7. Updating of row 7 with a positive target voltage can cause a positive voltage change affecting the adjacent sub-pixels with a positive change to each negative voltage of the adjacent sub-pixels, resulting in a decrease in brightness of the adjacent sub-pixels. The updating of the sub-pixel of row 8 (i.e., sub-pixel 8) can result in an increase in the brightness of sub-pixel 7 and a decrease in the brightness of sub-pixel 9, as shown in FIG. 5. The subsequent scans of rows 9-14 can result in increases and/or decreases of the sub-pixels in adjacent rows as shown in FIG. 5.

FIG. 5 illustrates the final effects of pixel-to-pixel coupling of voltage swings from aggressor sub-pixels to victim sub-pixels in block 2 after the update of row 13 is completed, e.g., as shown during the update of row 14, for example. In particular, sub-pixels 7, 8, 10, and 11 can have increased brightness, and sub-pixels 9 and 12 can have decreased brightness. This pattern of erroneous increases and decreases in brightness can remain until the sub-pixels are updated in the next frame and, consequently, the pattern may be observable as a visual artifact.

Figure 6:
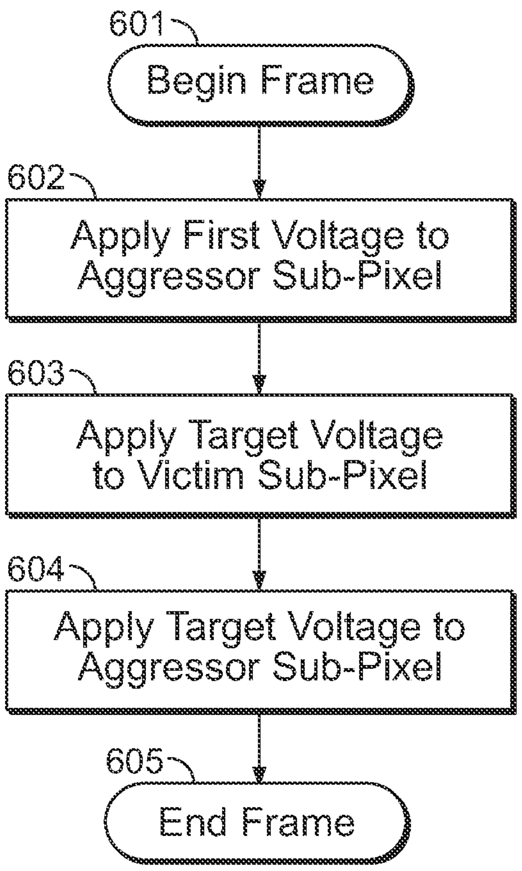
FIG. 6 is a flowchart that illustrates an example method of pre-charging sub-pixels, such as aggressor sub-pixels, according to various embodiments.

FIG. 6 is a flowchart that illustrates an example method of pre-charging sub-pixels, such as aggressor sub-pixels, according to various embodiments. Pre-charging an aggressor sub-pixel can help reduce or eliminate a large voltage change, such as a voltage swing from a positive voltage to a negative voltage, or vice-versa, that would have occurred when the aggressor sub-pixel is later updated with the target voltage of the aggressor sub-pixel.

In the example method, processing of a frame can begin (601) and rows of pixels can be scanned in a predetermined order according to a particular inversion scheme, such as M-line inversion, M-dot inversion, reordered M-line inversion, etc. A first voltage can be applied (602) to an aggressor sub-pixel. The first voltage can be, for example, ground or other fixed voltage, such as a mid-level gray voltage, a target voltage of a previous sub-pixel in the scanning order, the target voltage of the aggressor sub-pixel, etc. By applying the first voltage to the aggressor sub-pixel, the voltage of the aggressor sub-pixel from the previous frame can be changed to a voltage that is closer to the target voltage of the aggressor sub-pixel in the current frame. In this way, the voltage swing on the aggressor sub-pixel during the update of the aggressor pixel in the current frame can be reduced or eliminated.

After applying the first voltage to the aggressor sub-pixel, a target voltage of the victim sub-pixel can be applied (603) to the victim sub-pixel during an update of the victim sub-pixel. After the target voltage is applied to the victim sub-pixel, the target voltage of the aggressor sub-pixel can be applied (604) to the aggressor sub-pixel during the update of the aggressor sub-pixel. One skilled in the art would understand that other processing can occur before, during, and after each of the applications of voltages to the aggressor and victim sub-pixels shown in the example flow chart of FIG. 6. For example, other rows can be scanned and updated with corresponding target voltages before and/or after the application (602) of the first voltage to the aggressor sub-pixel. Likewise, other rows can be scanned and updated between the application (603) of the target voltage to the victim sub-pixel and the application (604) of the target voltage to the aggressor sub-pixel, etc. Processing of the frame can end (605) after the updating of all of the rows in the current frame is complete.

Figure 7:
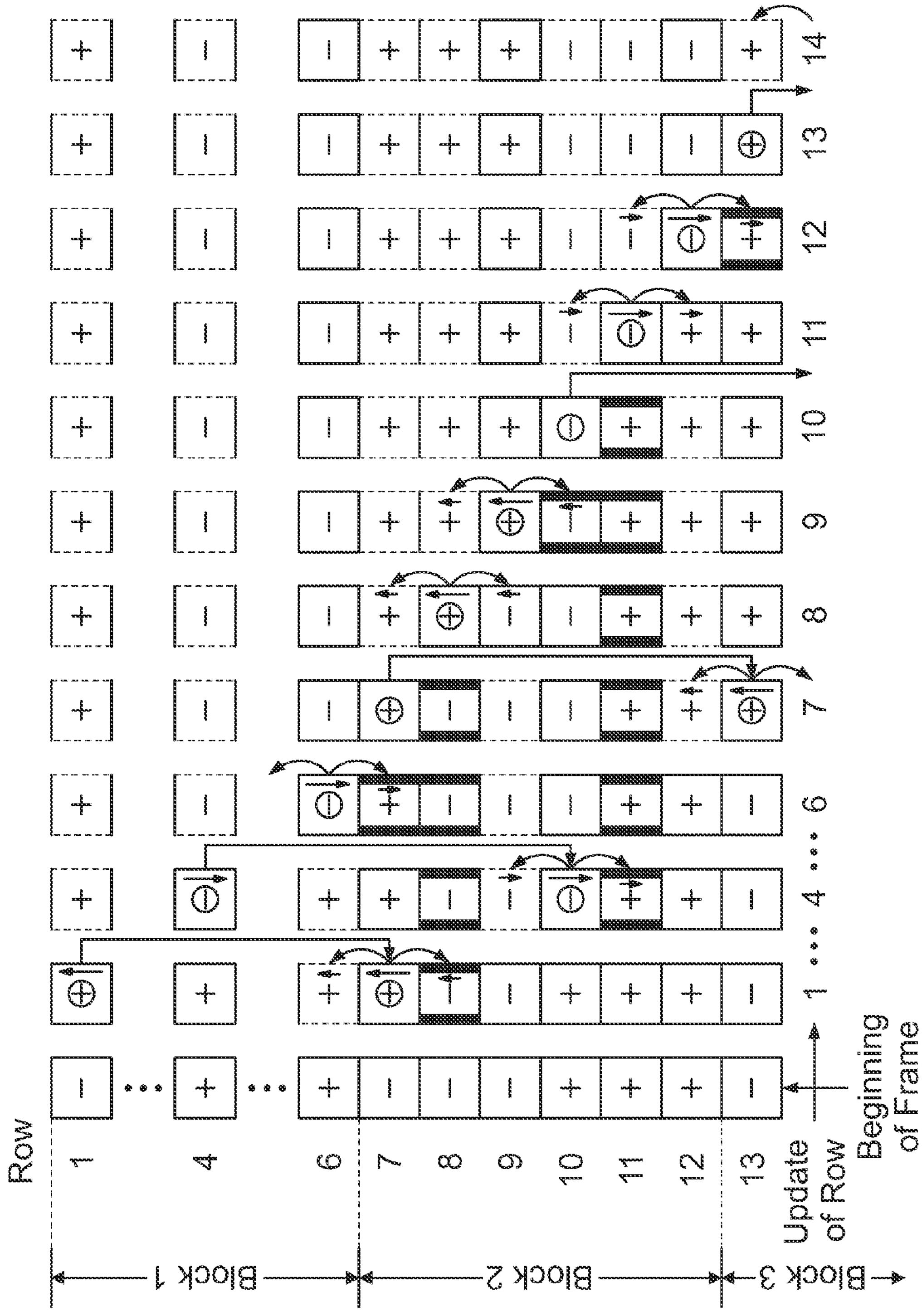
FIG. 7 illustrates an example method of pre-charging sub-pixels, such as aggressor sub-pixels, according to various embodiments.

FIG. 7 illustrates an example method of pre-charging sub-pixels, such as aggressor sub-pixels, according to various embodiments. This example illustrates an example pre-charging of aggressor sub-pixels in a 3-line (or 3-dot) inversion scheme, such as the inversion scheme used in the example in FIG. 5. For the sake of simplicity in the description below, the sub-pixel in the Nth row may be referred to as sub-pixel N.

In the example method of FIG. 7, two aggressor sub-pixels in each update block of six rows can be pre-charged with target voltages of sub-pixels in a preceding block. In particular, sub-pixels in the first and fourth lines of block 2 (i.e., sub-pixel 7 and sub-pixel 10) can be pre-charged with the target values of the first and fourth sub-pixels in block 1 (i.e., sub-pixel 1 and sub-pixel 4). At the beginning of the frame, the polarities of the sub-pixels can be the same as shown in the beginning of the frame in the example of FIG. 5. During an update of row 1, the target voltages for the sub-pixel 1 can be applied to sub-pixel 1. While the target voltages are being applied to the sub-pixel 1, the target voltages can concurrently be applied to the sub-pixel 7, as illustrated in FIG. 7 by an arrowed line between sub-pixels 1 and 7. The pre-charging of sub-pixel 7 can cause a positive voltage swing as illustrated by the large up-arrow in the sub-pixel, which can cause a corresponding positive change in the voltages of the adjacent sub-pixels 6 and 8. Specifically, the voltage swing in sub-pixel 7 can cause a positive change in the negative voltage currently on sub-pixel 8, which can decrease the brightness of sub-pixel 8. Likewise, the voltage swing in sub-pixel 7 can cause a positive change in the positive voltage currently on sub-pixel 6, which can increase the brightness of sub-pixel 6.

While the pre-charging of sub-pixel 7 can cause increases and decreases in the brightness of adjacent sub-pixels, the pre-charging occurs prior to the actual updating of sub-pixel 7 with the target voltages. In other words, pre-charging sub-pixel 7 can allow the large voltage swing that would occur during the update of sub-pixel 7 to occur prior to the updating of the victim sub-pixels (sub-pixel 6 and 8). While the pre-charging of sub-pixel 7 may cause erroneous increases and decreases in the brightness of the victim sub-pixels, the victim sub-pixels can soon be updated to their correct target voltages as the scanning of the display screen continues in the current frame. Therefore, any display artifacts that may have resulted from the increases and decreases in brightness can be overwritten in the current frame, which can reduce or eliminate the appearance of display artifacts in victim sub-pixels 6 and 8. In addition, when sub-pixel 7 is then updated to its target voltage during the normal course of the scanning, the updating of sub-pixel 7 with a positive polarity target voltage can create little or no voltage swing because sub-pixel 7 was pre-charged to a positive polarity voltage. In other words, pre-charging can time-shift the large voltage swing that would have caused sub-pixel 7 to be an aggressor sub-pixel during the update of sub-pixel 7, such that the large voltage swing can occur before the update of sub-pixel 7. In this way, sub-pixel 7 can be updated to its target voltage without causing a large voltage swing. In sum, by causing the large voltage swing on sub-pixel 7 to occur earlier in the scanning process, the effects of the voltage swing on sub-pixel 7 can be overwritten when the victim pixels are updated without reintroducing the erroneous brightness increases and decreases when sub-pixel 7 is updated with its target voltage.

Likewise, sub-pixel 10 can be pre-charged with the target value of sub-pixel 4 during the update of sub-pixel 4. When sub-pixel 4 is updated with a negative polarity target voltage, sub-pixel 10 can be updated with the same negative polarity target voltage of sub-pixel 4, as shown in FIG. 7. As with the pre-charging of sub-pixel 7, the pre-charging of sub-pixel 10 can affect adjacent sub-pixel by increasing the brightness of sub-pixel 9 and decreasing the brightness of sub-pixel 11. As with the pre-charging of sub-pixel 7, the erroneous increases and decreases in brightness of the adjacent sub-pixel of the pre-charged sub-pixel 10 can be overwritten with the target values of the victim sub-pixel in the subsequent updating of sub-pixel 9 and 11.

The scanning illustrated in FIG. 7 resumes with the update of sub-pixel 6 with a negative polarity target voltage that decreases the brightness of sub-pixel 7. Sub-pixel 7 is then updated with a positive polarity target voltage. While updating the pre-charged sub-pixel 7 can change the voltage on sub-pixel 7, in contrast to the example scanning shown in FIG. 5, updating the pre-charged sub-pixel 7 does not result in a large voltage swing. Therefore, updating sub-pixel 7 may result in only an imperceptible increase or decrease in the brightness of the adjacent sub-pixel. Although the pre-charged voltage on sub-pixel 7, i.e., the target voltage value of sub-pixel 1, and the update voltage value of sub-pixel 7, i.e., the target voltage value of sub-pixel 7, are both represented simply as a plus sign in the figure, one skilled in the art would understand that the values of the voltages can be different. In other words, the target voltage value of sub-pixel 1 can be different than the target voltage value of sub-pixel 7. Therefore, the update of sub-pixel 7 can cause a change in the voltage of sub-pixel 7 from the positive target voltage of sub-pixel 1 to the positive target voltage of sub-pixel 7. In contrast, if sub-pixel 7 had not been pre-charged, the updating of sub-pixel 7 would have resulted in a voltage change from a negative voltage to a positive voltage, which would have likely resulted in a larger voltage change than the update from one positive voltage to another positive voltage.

During the update of sub-pixel 7, the target voltage applied to sub-pixel 7 can also be applied to the first sub-pixel in block 3, i.e., sub-pixel 13. In other words, sub-pixel 13 can be pre-charged with the target voltage of sub-pixel 7, in the same way that sub-pixel 7 was pre-charged with the target voltage of the sub-pixel 1. Scanning block 2 can proceed as shown in FIG. 7, including pre-charging a sub-pixel in the next block with the target voltage of sub-pixel 10 during the update of sub-pixel 10. The final state of the sub-pixels of block 2 is illustrated, for example, during the scan of sub-pixel 14. In particular, sub-pixels 7, 8, 10 and 11 have increased brightness, while sub-pixels 9 and 12 can have the correct target voltage values. Compared to the example shown in FIG. 5, in which there was no pre-charging of aggressor sub-pixels, the state of the sub-pixel in block 2 during the scan of line 14, for example, show that pre-charging sub-pixels 7 and 10 can reduce or eliminate the erroneous decreases in the brightness of sub-pixels 9 and 12. Thus, pre-charging some of the aggressor sub-pixels can reduce display artifacts.

Figure 8:
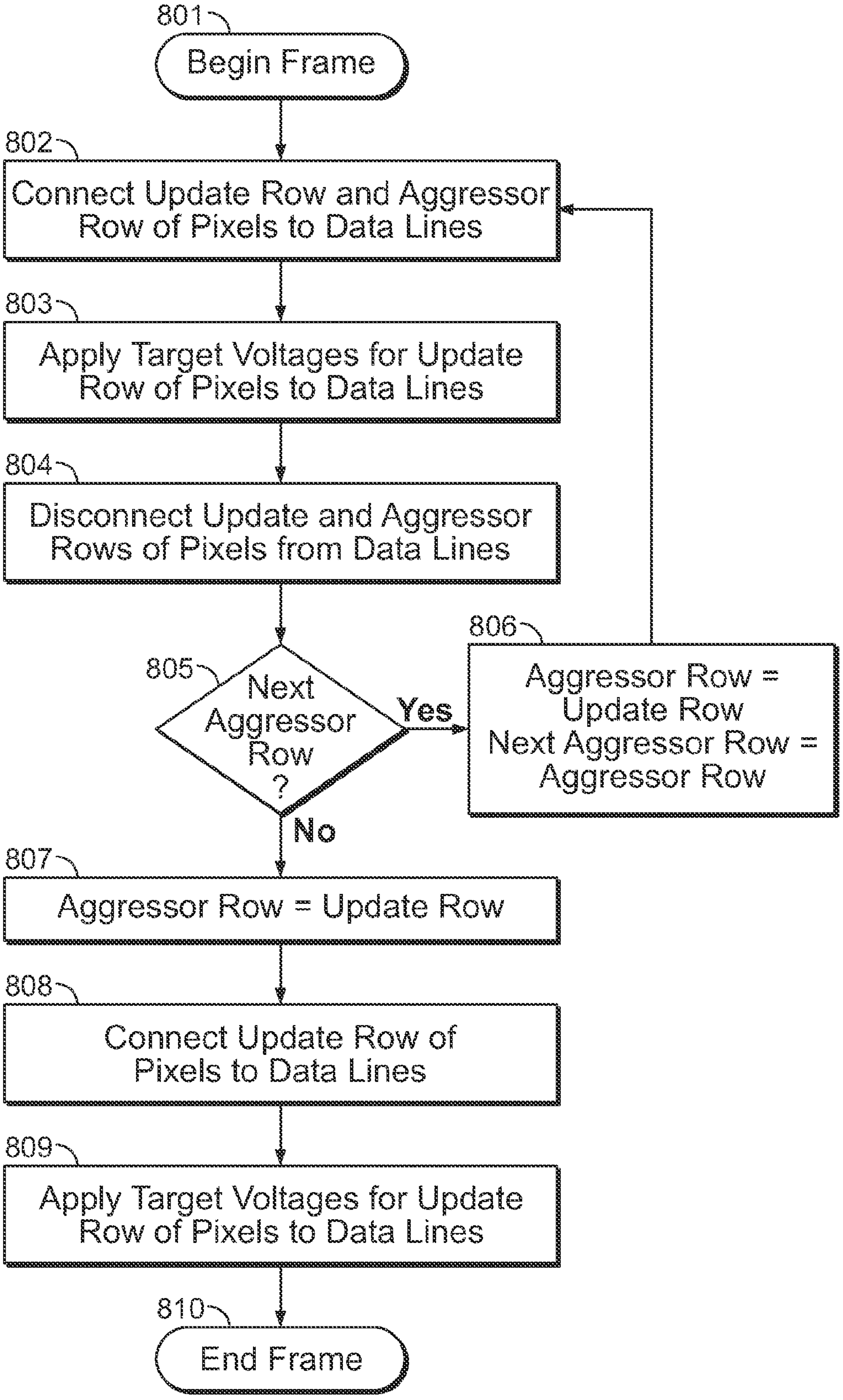
FIG. 8 is a flow chart of an example method of pre-charging sub-pixels, such as aggressor sub-pixels, according to various embodiments.

FIG. 8 is a flow chart of an example method of pre-charging sub-pixels, such as aggressor sub-pixels, according to various embodiments. Updating an image frame can begin (801) and processing such as scanning of various rows can occur. When scanning reaches a row that will be used to pre-charge aggressor sub-pixels in a row updated later in the order of scanning the frame, the update row, i.e., the row being updated, and the aggressor row, i.e., the row that includes aggressor sub-pixels, can be connected concurrently to the data lines of the display screen (802). For example, the gate lines of the update row and the aggressor row can be switched on during the scanning of the update row, as will be described in more detail below. Target voltages for the update row can be applied (803) to the data lines, and the update and aggressor rows can then be disconnected (804) from the data lines. In this way, for example, the aggressor sub-pixels can be pre-charged with the target voltages of sub-pixels scanned earlier in the particular scanning order. Referring to the example of FIG. 7, when row 1 is being updated with a positive polarity voltage applied to the data line corresponding to sub-pixel 1, sub-pixel 7 can be connected to the same data line, and can therefore be pre-charged with the same target voltage being applied to the data line during the update of sub-pixel 1. Referring again to FIG. 8, processing can continue until the scanning reaches the aggressor row, and the process can determine (805) whether or not there is another aggressor row later in the scanning order of the display. If the process determines that there is a next aggressor row, the current aggressor row can be set (806) to be the current update row, and the next aggressor row can be set to be the current aggressor row. For example, referring again to FIG. 7, when the process reaches sub-pixel 7, the process can determine that there is a next aggressor row, i.e., sub-pixel 13, corresponding to sub-pixel 7. Sub-pixel 7 can then become the sub-pixel being updated and sub-pixel 13 can become the aggressor sub-pixel to be pre-charged. Therefore, the process shown in FIG. 8 can return to connect (802) the current update row, sub-pixel 7, and the current aggressor row, sub-pixel 13, to the data lines, apply (803) the target voltage for sub-pixel 7 to the data lines, and subsequently disconnect (804) sub-pixels 7 and 13 from the data line. One skilled in the art would understand that the process shown in FIG. 8 can be applied in parallel for other aggressor sub-pixels and update rows used to pre-charge them, such as sub-pixels 4 and 10 in FIG. 7.

If the scanning process reaches a current aggressor row and determines (805) there are no more aggressor rows in the scanning order for the remainder of the frame, the current aggressor row can be set (807) to be the current update row, the update row can be connected (808) to the data lines, and target voltages for the update row can be applied (809) to the data lines, and processing can continue until the end of the frame (810).

In the present example, aggressor rows can also be used to pre-charge other aggressor rows. In some embodiments, other rows of display sub-pixels maybe used to pre-charge aggressor rows. For example, in FIG. 7, instead of using sub-pixel 1 to pre-charge sub-pixel 7, sub-pixel 2 could be used to pre-charge sub-pixel 7. Likewise, instead of using sub-pixel 7 to pre-charge sub-pixel 13, sub-pixel 8 could be used to pre-charge sub-pixel 13, etc. In some embodiments, aggressor sub-pixels can be pre-charged during the updating of update rows in the same block as the aggressor sub-pixels. In this regard, one skilled in the art would understand that the example process shown in FIG. 8 could be modified to allow pre-charging of aggressor sub-pixels in different ways.

Referring to the example shown in FIG. 7, while pre-charging aggressor sub-pixels with the target voltages of sub-pixels earlier in the order of scanning can reduce or eliminate display artifacts caused by the pre-charged aggressor sub-pixels, display artifacts caused by aggressor sub-pixels scanned at the beginning of the scanning order can remain. As shown in FIG. 7, an erroneous increase in the brightness of sub-pixel 1 can occur during the scanning of block 1. Likewise, an erroneous increase in brightness of sub-pixel 4 can occur during the scanning of block 1. The increases in the brightness of sub-pixels 1 and 4 (and errors in other sub-pixels in block 1, not shown) can go uncompensated, because while some of the sub-pixels in block 1 can used to pre-charge sub-pixels later in the scanning order, in this example embodiment, aggressor sub-pixels in block 1 are not pre-charged in this example embodiment. One skilled in the art would understand that aggressor sub-pixels that are updated early in the order of scanning can be pre-charged using voltage sources other than the target voltage values of other sub-pixels during the scanning order. For example, at the beginning of the scan of a current frame, before updating of the aggressor sub-pixels early in the order of scanning commences, pre-charge voltages can be applied to the aggressor sub-pixels using the data lines. When normal scanning commences, therefore, the voltages on the earlier occurring aggressor sub-pixels can be pre-charged to reduce or eliminate display artifacts. In this regard, one skilled in the art would understand that the other aggressor sub-pixels of the display screen could also be pre-charged using some other voltage source, for example, a ground, some other fixed voltage such as a mid-gray, etc. This example of pre-processing of aggressor sub-pixels in the first block in the scanning order may increase the time required to scan an image frame. On the other hand, one advantage of pre-charging aggressor sub-pixels using target voltage values applied during the updating of other sub-pixels can be an efficient use of scanning time by utilizing voltage sources that are being applied in the normal course of scanning to pre-charge aggressor sub-pixels without requiring additional time.

Figure 9:
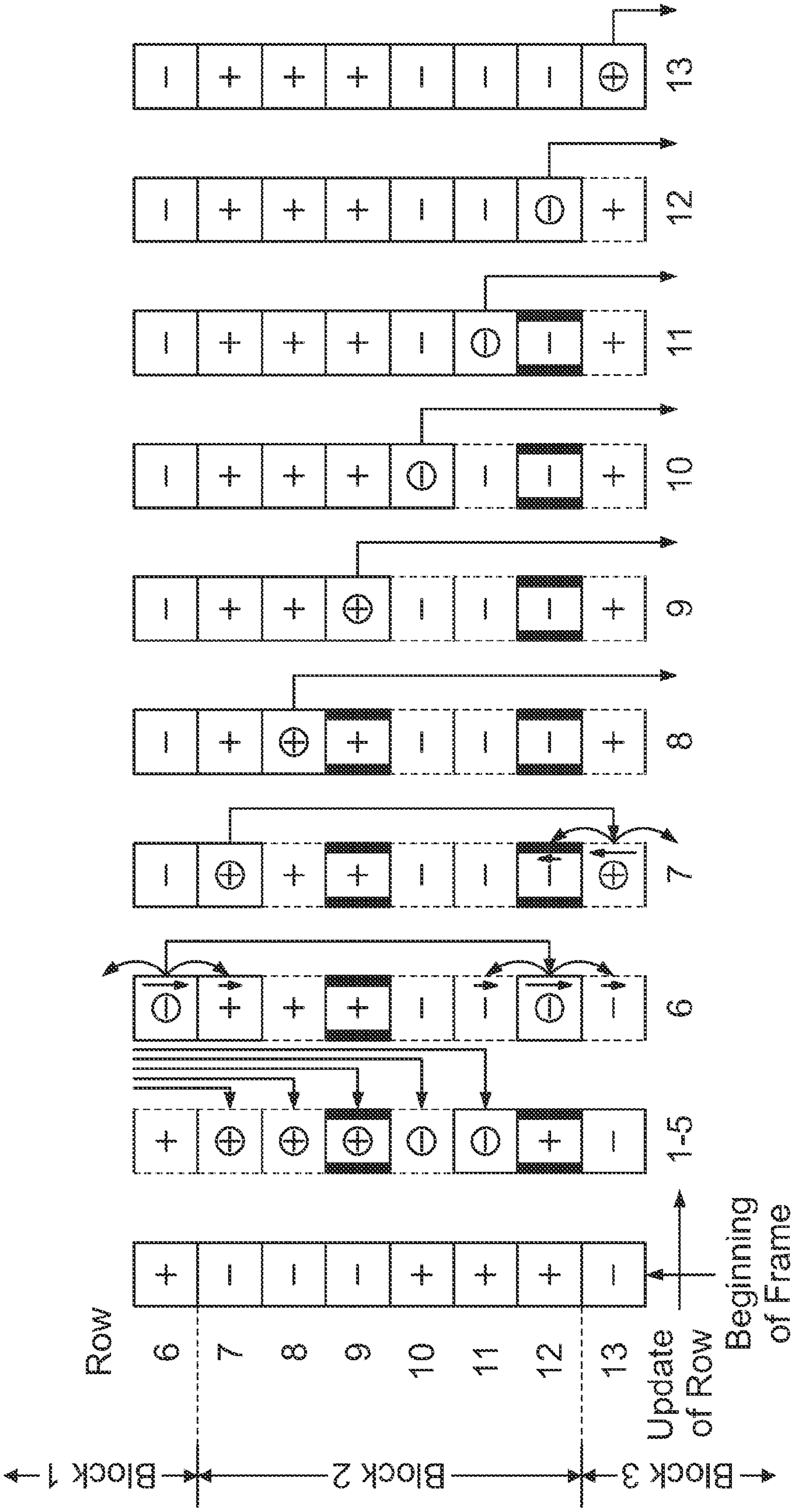
FIG. 9 illustrates another example process of pre-charging sub-pixels, such as aggressor sub-pixels, according to various embodiments.

FIG. 9 illustrates an example process of pre-charging sub-pixels, such as aggressor sub-pixels, according to various embodiments. In the example of FIG. 9, all of the aggressor sub-pixels in block 2 and subsequent blocks of a 3-line (3-dot) inversion scheme can be pre-charged with target values of sub-pixels earlier in the scanning order. At the beginning of the frame, the polarities of the voltages can be the same as in the example of FIG. 5. FIG. 9 shows that during the scanning of rows 1-5 of block 1, sub-pixels 7-11 of block 2 can be pre-charged with the corresponding target voltage values of the block 1 sub-pixels, i.e., sub-pixel 7 can be pre-charged with the target voltage value of sub-pixel 1, sub-pixel 8 can be pre-charged with the target voltage value of sub-pixel 2, etc. FIG. 9 shows the corresponding polarities of the sub-pixels as well as the resulting increases and decreases in brightness of the sub-pixels at the end of the updating of sub-pixel 5. During the scan of sub-pixel 6, which has not been pre-charged in this example embodiment, the application of the target negative polarity voltage to sub-pixel 6 can cause a large negative voltage swing on that sub-pixel which can cause a decrease in the brightness of adjacent sub-pixel 7. FIG. 9 also shows that during the update of sub-pixel 6, the target voltage applied to sub-pixel 6 can concurrently be applied to sub-pixel 12. At the beginning of the updating of sub-pixel 7, i.e., the beginning of the scan of the sub-pixels of block 2, all of the sub-pixels of block 2 can be pre-charged. As can be seen in the figure, none of the updates to sub-pixels 7-12 during the scan of block 2 cause large voltage swings in the sub-pixels, because the sub-pixels have been pre-charged. Therefore, while each update of a sub-pixel in block 2 can overwrite any pre-existing errors in brightness, none of the updates can cause new errors in brightness. Accordingly, no errors exist in the sub-pixels of block 2 after block 2 has been completely updated, for example, as shown during the scan of sub-pixel 13.

Figure 10:
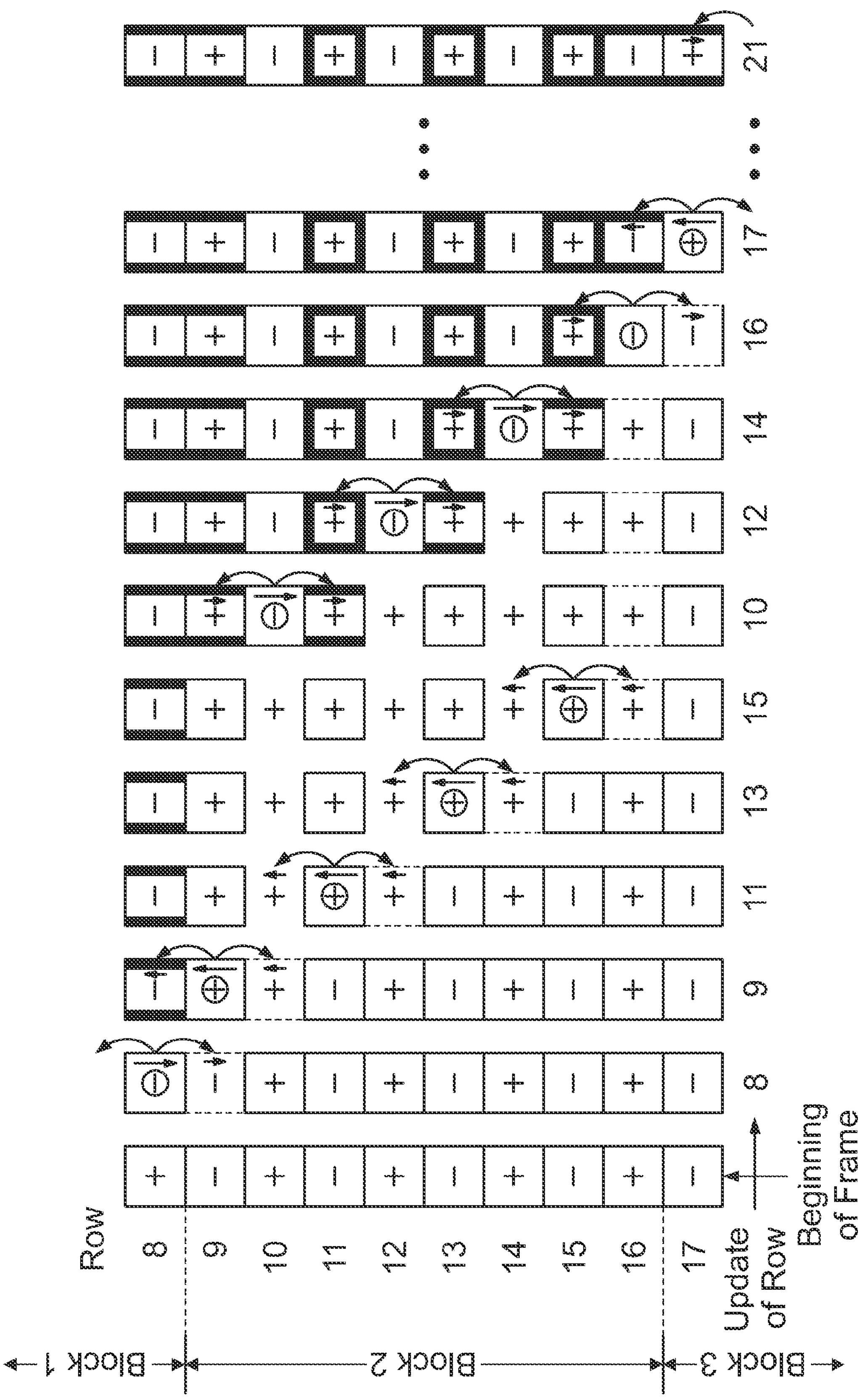
FIG. 10 illustrates an example scanning operation using a reordered 4-line inversion scheme.

FIG. 10 illustrates an example scanning operation using a reordered 4-line inversion scheme. FIG. 10 shows the complete scanning of a block of eight rows of the reordered 4-line inversion scheme, i.e., block 2, which includes rows 9-16. FIG. 10 also illustrates the updating of an adjacent row above block 2 (i.e., row 8), which is the last row in block 1, and the updating of an adjacent row after block 2 (i.e., row 17), which is the first row in block 3.

At the beginning of the frame, the voltage polarities of the sub-pixels in the first, third, fifth, and seventh rows of block 2 (i.e., sub-pixels 9, 11, 13, and 15) can be negative, and the voltage polarities of the sub-pixels in the second, fourth, sixth, and eighth rows of block 2 (i.e., sub-pixels 10, 12, 14, and 16) can be positive. In this example reordered 4-line inversion scheme, each block can be scanned in the following order of rows: first row, third row, fifth row, seventh row, second row, fourth row, sixth row, eighth row. Scanning of the display can begin with the update of the first row in the block 1 (i.e., row 1, not shown) and continue until scanning reaches row 8. FIG. 10 illustrates the scanning of row 8, during which a negative voltage can be applied to the pixel electrode of sub-pixel 8 to update the sub-pixel to its target voltage for the current frame. Updating sub-pixel 8 can result in a large negative swing in voltage, which can cause a corresponding negative change to the negative voltage of the sub-pixel of row 9 (i.e., sub-pixel 9), resulting in an increase in the brightness of sub-pixel 9. Updating of row 9 with a positive target voltage can cause a positive voltage change affecting the adjacent sub-pixels with a positive change to the negative voltage of sub-pixel 8 and the positive voltage of sub-pixel 10, resulting in a decrease in brightness of sub-pixel 8 and an increase in brightness of sub-pixel 10. Scanning block 2 can continue with the updating of sub-pixel 11, which can result in a further increase in the brightness of sub-pixel 10. A new notation is introduced in FIG. 10 to represent a further increase in brightness of a sub-pixel, i.e., in the case that an erroneous increase in brightness of a victim sub-pixel occurs twice.

The further increase in the brightness of sub-pixel 10 is represented by the removal of the left and right borders of the sub-pixel.

The updating of sub-pixel 11 also can result in an increase in the brightness of sub-pixel 12. The scanning of block 2 can continue with the updating of sub-pixels, 13, 15, 10, 12, 14, and 16, as shown in FIG. 10. In some cases during the scanning of block 2, the brightness of a victim sub-pixel can be decreased twice, i.e., by two aggressor sub-pixels. For example, the brightness of sub-pixel 11 can be decreased during the updating of sub-pixel 10. Then, during the updating of sub-pixel 12, the brightness of sub-pixel 11 can be further decreased. The further decrease in brightness is represented in the figures by a new notation of thicker, dark lines used for the left, right, top, and bottom borders of the sub-pixel.

FIG. 10 illustrates the final effects of pixel-to-pixel coupling of voltage swings from aggressor sub-pixels to victim sub-pixels in block 2 after the update of row 16 is completed, e.g., as shown during the update of row 21, for example. In particular, sub-pixels 9 and 16 can have decreased brightness, sub-pixels 10, 12, and 14 can have no errors in brightness, and sub-pixels 11, 13, and 15 can have further decreased brightness. This pattern of erroneous brightness can remain until the sub-pixels are updated in the next frame and, consequently, the pattern may be observable as a visual artifact.

Figure 11:
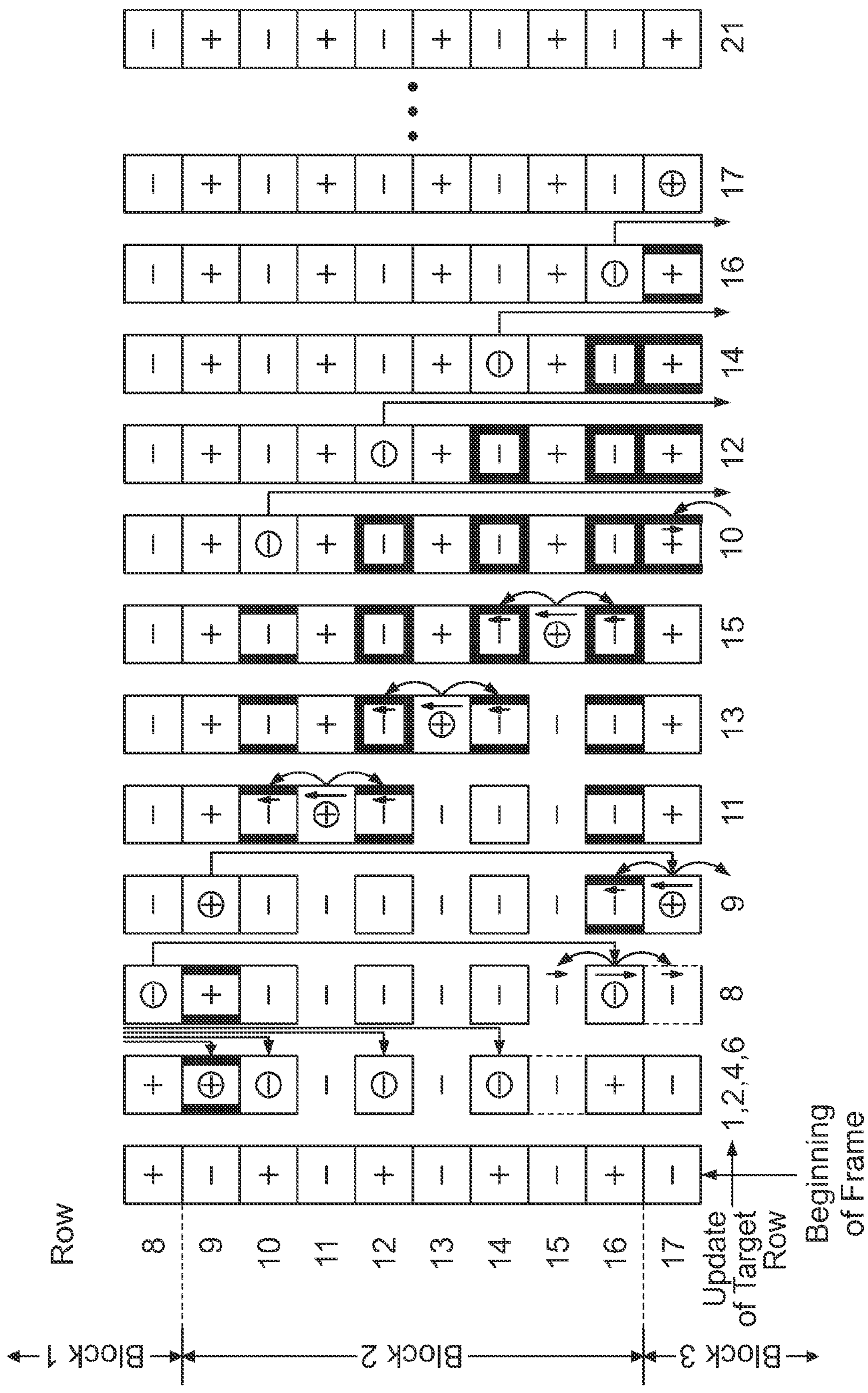
FIG. 11 illustrates another example process of pre-charging sub-pixels, such as aggressor sub-pixels, according to various embodiments.

FIG. 11 illustrates an example process of pre-charging sub-pixels, such as aggressor sub-pixels, according to various embodiments. In the example of FIG. 11, some of the aggressor sub-pixels in block 2 and subsequent blocks of a reordered 4-line inversion scheme, such as illustrated in FIG. 10, can be pre-charged with target values of sub-pixels earlier in the scanning order. At the beginning of the frame, the polarities of the voltages can be the same as in the example of FIG. 10. FIG. 11 shows that during the scanning of rows 1, 2, 4, and 6 of block 1, sub-pixels 9, 10, 12, and 14 of block 2 can be pre-charged with the corresponding target values of the block 1 sub-pixels. FIG. 11 shows the corresponding polarities of the sub-pixels as well as the resulting increases and decreases in brightness of the sub-pixels at the end of the updating of sub-pixel 6. During the scan of sub-pixel 8, which has not been pre-charged in this example embodiment, the application of the target negative polarity voltage to sub-pixel 8 can cause a large negative voltage swing on that sub-pixel which can cause a decrease in the brightness of adjacent sub-pixel 9. FIG. 11 also shows that during the update of sub-pixel 8, the target voltage applied to sub-pixel 8 can concurrently be applied to sub-pixel 16. At the beginning of the updating of sub-pixel 9, i.e., the beginning of the scan of the sub-pixels of block 2, sub-pixels 9, 10, 12, 14, and 16 of block 2 can be pre-charged. As can be seen in the figure, some of the updates to the sub-pixels during the scan of block 2 can cause large voltage swings in the sub-pixels. Specifically, updating sub-pixels 11, 13, and 15 can cause large voltage swings, i.e., sub-pixels 11, 13, and 15 are aggressor sub-pixels that have not been pre-charged. However, the erroneous effects on the brightness of the victim sub-pixels can be overwritten when the pre-charged sub-pixels are updated during the normal course of scanning. Additionally, updating the pre-charged sub-pixels can result in no large voltage swings that could otherwise introduce new errors in brightness. Accordingly, no errors exist in the sub-pixels of block 2 after block 2 has been completely updated, for example, as shown during the scan of sub-pixel 21.

Figure 12:
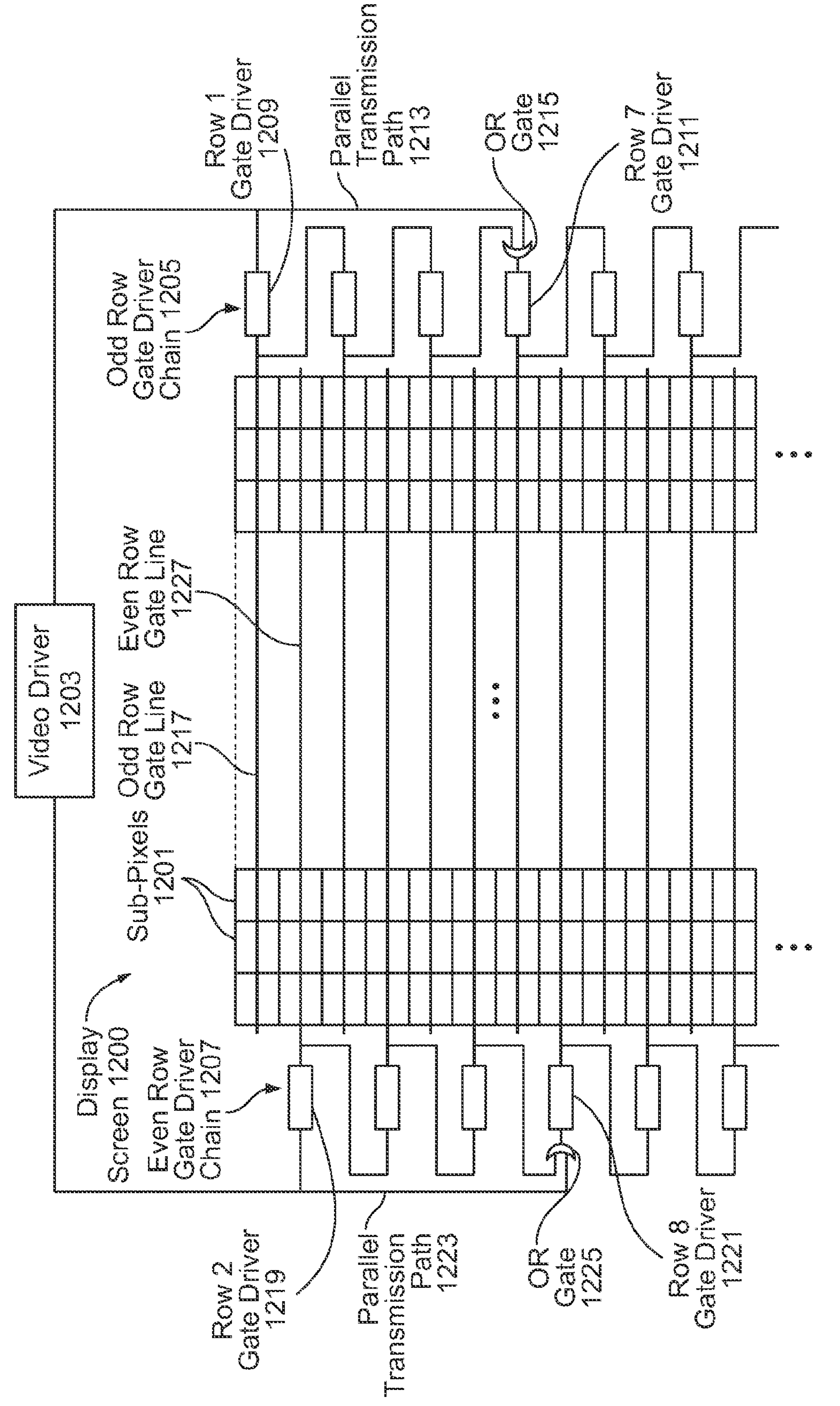
FIG. 12 illustrates an example gate line system for pre-charging sub-pixels in during a scan of an example display screen according to various embodiments.

FIG. 12 illustrates an example gate line system for pre-charging sub-pixels, such as aggressor sub-pixels, in during a scan of an example display screen 1200 according to various embodiments. The example gate line system can pre-charge aggressor sub-pixels in all rows after the first block of six rows in a 3-line (or 3-dot) inversion scheme, such as the example pre-charging of aggressor sub-pixels illustrated in FIG. 5. In particular, when a row is updated, the target voltage used to update a sub-pixel in the row can be applied to a corresponding sub-pixel in the next block of rows to be scanned, i.e., applied to the sub-pixel that is six rows after the current row being updated.

Display screen 1200 can include multiple rows of sub-pixels 1201. A video driver 1203 can scan display screen 1200 with a gate line system including an odd gate driver chain 1205 that can scan odd numbered rows of sub-pixels 1201 and an even gate driver chain 1207 that can scan even numbered rows of the sub-pixels. Odd row gate driver chain 1205 can include multiple gate drivers, e.g., one gate driver for each odd numbered row, including a row 1 gate driver 1209 and a row 7 gate driver 1211. Video driver 1203 can be connected to row 1 gate driver 1209. Video driver 1203 can also be connected to row 7 gate driver 1211 through a parallel transmission path 1213 and an OR gate 1215, which can allow the row 7 gate driver to be connected to the parallel transmission path and the previous gate driver in odd row gate driver chain 1205. Each gate driver in odd row gate driver chain 1205 can be connected to an odd row gate line 1217.

Likewise, even row gate driver chain 1207 can include multiple gate drivers, e.g., one gate driver for each even numbered row, including a row 2 gate driver 1219 and a row 8 gate driver 1221. Video driver 1203 can be connected to row 2 gate driver 1219. Video driver 1203 can also be connected to row 8 gate driver 1221 through a parallel transmission path 1223 and an OR gate 1225, which can allow the row 8 gate driver to be connected to the parallel transmission path and the previous gate driver in even row gate driver chain 1207. Each gate driver in even row gate driver chain 1207 can be connected to an even row gate line 1227.

The example gate line system can use the application of a target voltage during the update a sub-pixel of a row to pre-charge a sub-pixel that is six rows after the row that is currently being updated. Video driver 1203 can begin a scan of the odd rows of sub-pixels for a current image frame of display screen 1200 by transmitting a start frame pulse to row 1 gate driver 1209, which can cause the row 1 gate driver to switch on the pixel TFTs (not shown) in sub-pixels 1201 of row 1 while target voltages are applied to the data lines (not shown) to update row 1. The start frame pulse can also travel through parallel transmission path 1213 to row 7 gate driver 1211, such that the row 7 gate driver switches on the pixel TFTs in sub-pixels 1201 of row 7 while the target voltages for the sub-pixels of row 1 are being applied to the data lines. In this way, for example, the target voltages of the row 1 sub-pixels being applied to the data lines during the updating of row 1 can be applied to the row 7 sub-pixels, thus, pre-charging the sub-pixels of row 7 with the target voltages of the row 1 sub-pixels.

Likewise, video driver 1203 can begin a scan of the even rows of sub-pixels for a current image frame of display screen 1200 by transmitting a start frame pulse to row 2 gate driver 1219, which can cause the row 2 gate driver to switch on the pixel TFTs in sub-pixels 1201 of row 2 while target voltages are applied to the data lines to update row 2. The start frame pulse can also travel through parallel transmission path 1223 to row 8 gate driver 1221, such that the row 8 gate driver switches on the pixel TFTs in sub-pixels 1201 of row 8 while the target voltages for the sub-pixels of row 2 are being applied to the data lines. As with the odd rows, for example, the target voltages of the row 2 sub-pixels being applied to the data lines during the updating of row 2 can be applied to the row 8 sub-pixels, thus, pre-charging the sub-pixels of row 8 with the target voltages of the row 2 sub-pixels.

Odd row gate driver chain 1205 can propagate the start frame pulse from the row 1 gate driver to the row 3 gate driver such that row 3 can be updated next after the update of row 2. Likewise, the start frame pulse received by the row 7 gate driver can be propagated through odd row gate driver chain 1205 to the row 9 gate driver, and the pixel TFTs in rows 3 and 9 can be switched on concurrently during the updating of row 3 with the target voltages of the row 3 sub-pixels, such that the sub-pixels of row 9 can be pre-charged with the target voltages of the row 3 sub-pixels. The scanning process can continue to update a row of sub-pixels while concurrently pre-charging the sixth row of sub-pixels after the updating row.

One skilled in the art would understand that the example gate driver system described above can be modified to pre-charge different rows in the scanning order, for example. Although the example embodiment utilizes two gate driver chains on opposing sides of the display to scan odd and even rows, one skilled in the art would understand that other configurations of gate drivers, such as a single gate driver chain for all rows, can be used.

In another example embodiment of a system for pre-charging sub-pixels, a gate line system of a display can include one (or more) gate driver chains without a parallel transmission path. In this example, a video driver can transmit two or more start frame pulses to the gate driver chain. The timing of the transmission of the start frame pulses can allow one or more rows of sub-pixels that are later in the scanning order to be switched on during the updating of a row that is earlier in the scanning order.

For example, in a 3-line (or 3-dot) inversion scheme, a first start frame pulse can be transmitted by the video driver through a gate driver chain at a first time, and a second start frame pulse can be transmitted by the video driver through the gate driver chain at a second time, such that the second start frame pulse is received by a row 1 gate driver at the same time that the first start frame pulse is received by the row 7 gate driver. When the pixel TFTs of the sub-pixels of rows 1 and 7 are switched on, target voltages for row 1 can be applied to the data lines to update row 1 and concurrently pre-charge row 7. As the pulses propagate through the gate driver chain, when a row is updated, the target voltage used to update a sub-pixel in the row can be applied to a corresponding sub-pixel in the next block of rows to be scanned, i.e., applied to the sub-pixel that is six rows after the current row being updated.

Although embodiments of this disclosure have been fully described with reference to the accompanying drawings, it is to be noted that various changes and modifications including, but not limited to, combining features of different embodiments, omitting a feature or features, etc., as will be apparent to those skilled in the art in light of the present description and figures.

For example, one or more of the functions of pre-charging aggressor sub-pixels described above can be performed by computer-executable instructions, such as software/firmware, residing in a medium, such as a memory, that can be executed by a processor, as one skilled in the art would understand. The software/firmware can be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any physical medium that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like. In the context of this document, a "non-transitory computer-readable storage medium" does not include signals. In contrast, in the context of this document, a "computer-readable medium" can include all of the media described above, and can also include signals.

Figure 13:
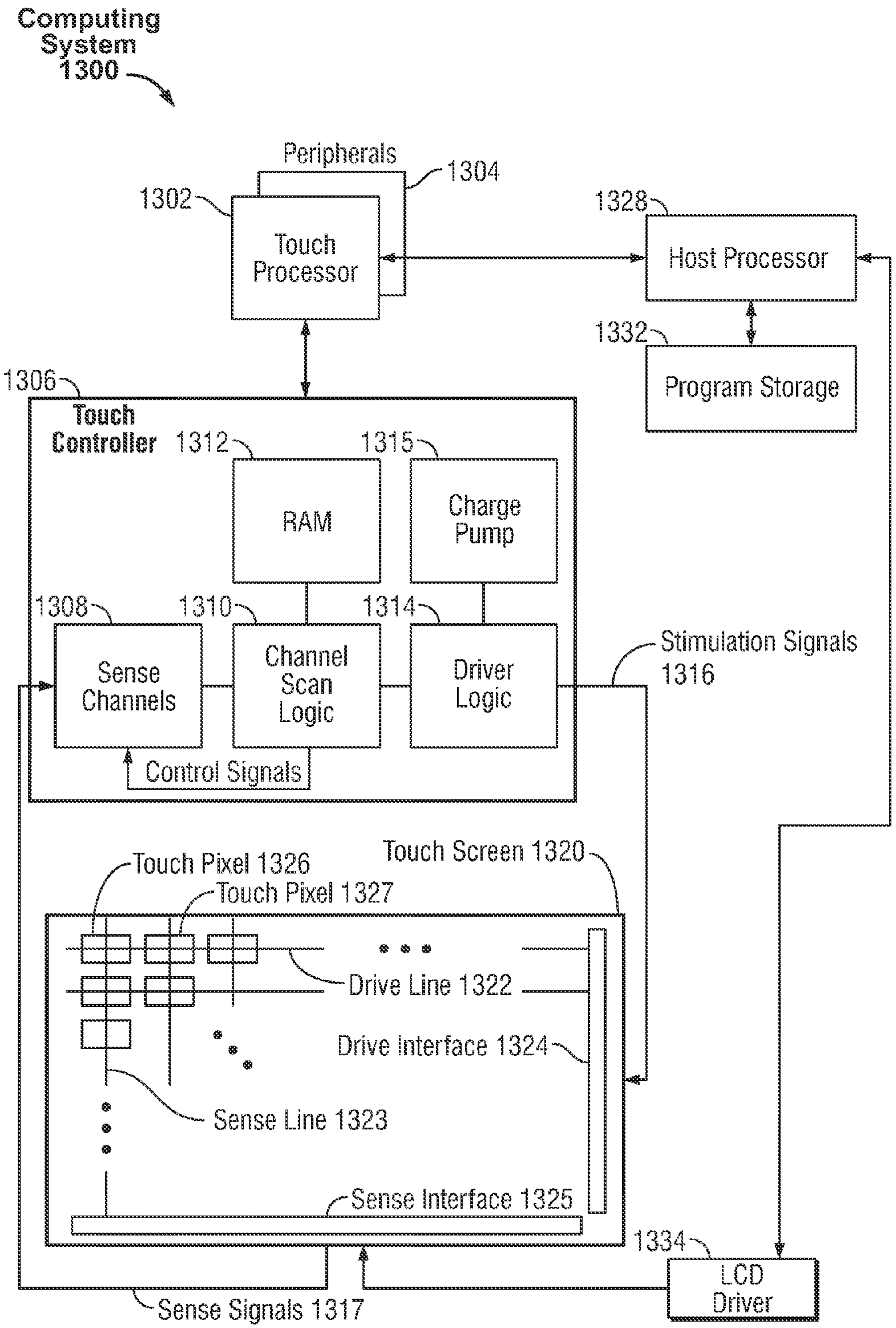
FIG. 13 is a block diagram of an example computing system that illustrates one implementation of an example scanning system of a display screen according to embodiments of the disclosure.

FIG. 13 is a block diagram of an example computing system 1300 that illustrates one implementation of an example scanning system of a display screen according to embodiments of the disclosure. In the example of FIG. 13, the computing system is a touch sensing system 1300 and the display screen is a touch screen 1320, although it should be understood that the touch sensing system is merely one example of a computing system, and that the touch screen is merely one example of a type of display screen. Computing system 1300 could be included in, for example, mobile telephone 136, digital media player 140, personal computer 144, or any mobile or non-mobile computing device that includes a touch screen. Computing system 1300 can include a touch sensing system including one or more touch processors 1302, peripherals 1304, a touch controller 1306, and touch sensing circuitry (described in more detail below). Peripherals 1304 can include, but are not limited to, random access memory (RAM) or other types of memory or non-transitory computer-readable storage media capable of storing program instructions executable by the touch processor 1302, watchdog timers and the like. Touch controller 1306 can include, but is not limited to, one or more sense channels 1308, channel scan logic 1310 and driver logic 1314. Channel scan logic 1310 can access RAM 1312, autonomously read data from the sense channels and provide control for the sense channels. In addition, channel scan logic 1310 can control driver logic 1314 to generate stimulation signals 1316 at various frequencies and phases that can be selectively applied to drive regions of the touch sensing circuitry of touch screen 1320. In some embodiments, touch controller 1306, touch processor 1302 and peripherals 1304 can be integrated into a single application specific integrated circuit (ASIC). A processor, such as touch processor 1302, executing instructions stored in non-transitory computer-readable storage media found in peripherals 1304 or RAM 1312, can control touch sensing and processing, for example.

Computing system 1300 can also include a host processor 1328 for receiving outputs from touch processor 1302 and performing actions based on the outputs. For example, host processor 1328 can be connected to program storage 1332 and a display controller, such as an LCD driver 1334. Host processor 1328 can use LCD driver 1334 to generate an image on touch screen 1320, such as an image of a user interface (UI), by executing instructions stored in non-transitory computer-readable storage media found in program storage 1332, for example, to scan lines (e.g., rows) of sub-pixels of touch screen 1320 by applying voltages to pixel electrodes of adjacent sub-pixels in different lines such that polarity changes in opposite directions can occur in two sub-pixels that are adjacent to a particular sub-pixel. In other words, host processor 1328 and LCD driver 1334 can operate as a scanning system in accordance with the foregoing example embodiments. In some embodiments the touch processor 1302, touch controller 1306, or host processor 1328 may independently or cooperatively operate as a scanning system in accordance with the foregoing example embodiments. Host processor 1328 can use touch processor 1302 and touch controller 1306 to detect and process a touch on or near touch screen 1320, such a touch input to the displayed UI. The touch input can be used by computer programs stored in program storage 1332 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1328 can also perform additional functions that may not be related to touch processing.

Touch screen 1320 can include touch sensing circuitry that can include a capacitive sensing medium having a plurality of drive lines 1322 and a plurality of sense lines 1323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 1322 can be driven by stimulation signals 1316 from driver logic 1314 through a drive interface 1324, and resulting sense signals 1317 generated in sense lines 1323 can be transmitted through a sense interface 1325 to sense channels 1308 (also referred to as an event detection and demodulation circuit) in touch controller 1306. In this way, drive lines and sense lines can be part of the touch sensing circuitry that can interact to form capacitive sensing nodes, which can be thought of as touch picture elements (touch pixels), such as touch pixels 1326 and 1327. This way of understanding can be particularly useful when touch screen 1320 is viewed as capturing an "image" of touch. In other words, after touch controller 1306 has determined whether a touch has been detected at each touch pixel in the touch screen, the pattern of touch pixels in the touch screen at which a touch occurred can be thought of as an "image" of touch (e.g. a pattern of fingers touching the touch screen).

In some example embodiments, touch screen 1320 can be an integrated touch screen in which touch sensing circuit elements of the touch sensing system can be integrated into the display pixels stackups of a display.

Although various embodiments are described with respect to display pixels, one skilled in the art would understand that the term display pixels can be used interchangeably with the term display sub-pixels in embodiments in which display pixels are divided into sub-pixels. For example, some embodiments directed to RGB displays can include display pixels divided into red, green, and blue sub-pixels. One skilled in the art would understand that other types of display screen could be used. For example, in some embodiments, a sub-pixel may be based on other colors of light or other wavelengths of electromagnetic radiation (e.g., infrared) or may be based on a monochromatic configuration, in which each structure shown in the figures as a sub-pixel can be a pixel of a single color.

What is claimed is:

1. A method of updating an image displayed by a display screen in a first image frame, the display screen including a plurality of sub-pixels including a first sub-pixel with a first pixel electrode and a second sub-pixel with a second pixel electrode, the second sub-pixel being disposed adjacent to the first sub-pixel, the method comprising:

applying a first voltage to the second pixel electrode;

updating the first pixel electrode to a first target voltage value corresponding to a first luminance of the first sub-pixel by applying a second voltage to the first pixel electrode, the second voltage being applied after the application of the first voltage;

updating the second pixel electrode to a second target voltage value corresponding to a second luminance of the second sub-pixel by applying a third voltage to the second pixel electrode, the third voltage being applied after the application of the second voltage; and applying the first voltage to a third pixel electrode of a third sub-pixel concurrently with the application of the first voltage to the second pixel electrode.

2. The method of claim 1, wherein the application of the first voltage changes a voltage polarity of the second pixel electrode.

3. The method of claim 1, wherein the first voltage includes one of ground, a mid-level gray voltage corresponding to a mid-level gray luminance of the sub-pixel, and a target voltage of a third pixel electrode of a third sub-pixel.

4. The method of claim 1, wherein applying the first voltage concurrently to the second and third pixel electrodes includes connecting the second and third pixel electrodes to a data line and applying the first voltage to the data line.

5. The method of claim 4, wherein the display screen includes a first gate driver connected to a first transistor of the first sub-pixel, a second gate driver connected to a second transistor of the second sub-pixel, and a third gate driver connected to a third transistor of the third sub-pixel, the first, second, and third gate drivers being included in a gate driver chain, wherein connecting the second and third pixel electrodes to the data line includes transmitting a first start frame pulse through the gate driver chain at a first time, and transmitting a second start frame pulse through the gate driver chain at a second time, such that the second gate driver receives the first start frame pulse and the third gate driver receives the second start frame pulse concurrently.

6. The method of claim 4, wherein the display screen includes a first gate driver connected to a first transistor of the first sub-pixel, a second gate driver connected to a second transistor of the second sub-pixel, and a third gate driver connected to a third transistor of the third sub-pixel, the first, second, and third gate drivers being included in a gate driver chain, wherein connecting the second and third pixel electrodes to the data line includes the third gate driver switching on the third transistor in response to receiving a first start frame pulse through the gate driver chain, and the second gate driver switching on the second transistor in response to receiving a second start frame pulse through a transmission path that is in parallel to the gate driver chain.

7. The method of claim 1, wherein the sub-pixels of the display screen are arranged in a plurality of update lines, each update line including a plurality of sub-pixels, wherein the first and second sub-pixels are disposed in a first update line and a second update line, respectively, the plurality of update lines being updated in predetermined scanning order, such that the update of the first update line occurs before the update of the second update line in the scanning order.

8. The method of claim 7, further comprising:

applying the first voltage to a third pixel electrode of a third sub-pixel, the second and third sub-pixels being updated in different blocks of update lines in the scanning order, such that the first voltage is applied concurrently to the second and third pixel electrodes.

9. An apparatus comprising:

a display screen including a plurality of sub-pixels including a first sub-pixel with a first pixel electrode and a second sub-pixel with a second pixel electrode, the second sub-pixel being disposed adjacent to the first sub-pixel; and a pre-charging system that applies a first voltage to the second pixel electrode, updates the first pixel electrode to a first target voltage value corresponding to a first luminance of the first sub-pixel by applying a second voltage to the first pixel electrode, the second voltage being applied after the application of the first voltage, updates the second pixel electrode to a second target voltage value corresponding to a second luminance of the second sub-pixel by applying a third voltage to the second pixel electrode, the third voltage being applied after the application of the second voltage; and applies the first voltage to a third pixel electrode of a third sub-pixel concurrently with the application of the first voltage to the second pixel electrode.

10. The apparatus of claim 9, wherein the application of the first voltage changes a voltage polarity of the second pixel electrode.

11. The apparatus of claim 9, wherein the first voltage includes one of ground, a mid-level gray voltage corresponding to a mid-level gray luminance of the sub-pixel, and a target voltage of a third pixel electrode of a third sub-pixel.

12. The apparatus of claim 9, wherein applying the first voltage concurrently to the second and third pixel electrodes includes connecting the second and third pixel electrodes to a data line and applying the first voltage to the data line.

13. The apparatus of claim 12, wherein the pre-charging system includes a first gate driver connected to a first transistor of the first sub-pixel, a second gate driver connected to a second transistor of the second sub-pixel, and a third gate driver connected to a third transistor of the third sub-pixel, the first, second, and third gate drivers being included in a gate driver chain, wherein connecting the second and third pixel electrodes to the data line includes transmitting a first start frame pulse through the gate driver chain at a first time, and transmitting a second start frame pulse through the gate driver chain at a second time, such that the second gate driver receives the first start frame pulse and the third gate driver receives the second start frame pulse concurrently.

14. The apparatus of claim 12, wherein the pre-charging system includes a first gate driver connected to a first transistor of the first sub-pixel, a second gate driver connected to a second transistor of the second sub-pixel, and a third gate driver connected to a third transistor of the third sub-pixel, the first, second, and third gate drivers being included in a gate driver chain, wherein connecting the second and third pixel electrodes to the data line includes the third gate driver switching on the third transistor in response to receiving a first start frame pulse through the gate driver chain, and the second gate driver switching on the second transistor in response to receiving a second start frame pulse through a transmission path that is in parallel to the gate driver chain.

15. The apparatus of claim 9, wherein the sub-pixels of the display screen are arranged in a plurality of update lines, each update line including a plurality of sub-pixels, wherein the first and second sub-pixels are disposed in a first update line and a second update line, respectively, the plurality of update lines being updated in predetermined scanning order, such that the update of the first update line occurs before the update of the second update line in the scanning order.

16. The apparatus of claim 15, wherein the pre-charging system further applies the first voltage to a third pixel electrode of a third sub-pixel, the second and third sub-pixels being updated in different blocks of update lines in the scanning order, such that the first voltage is applied concurrently to the second and third pixel electrodes.

17. A non-transitory computer-readable storage medium storing computer-readable instructions that, when executed by a computing device, cause the device to perform a method of updating an image displayed by a display screen in a first image frame, the display screen including a plurality of sub-pixels including a first sub-pixel with a first pixel electrode and a second sub-pixel with a second pixel electrode, the second sub-pixel being disposed adjacent to the first sub-pixel, the method comprising:

applying a first voltage to the second pixel electrode;

updating the first pixel electrode to a first target voltage value corresponding to a first luminance of the first sub-pixel by applying a second voltage to the first pixel electrode, the second voltage being applied after the application of the first voltage;

updating the second pixel electrode to a second target voltage value corresponding to a second luminance of the second sub-pixel by applying a third voltage to the second pixel electrode, the third voltage being applied after the application of the second voltage; and applying the first voltage to a third pixel electrode of a third sub-pixel concurrently with the application of the first voltage to the second pixel electrode.

18. The non-transitory computer-readable storage medium of claim 17, wherein applying the first voltage concurrently to the second and third pixel electrodes includes connecting the second and third pixel electrodes to a data line and applying the first voltage to the data line.

19. The non-transitory computer-readable storage medium of claim 18, wherein the display screen includes a first gate driver connected to a first transistor of the first sub-pixel, a second gate driver connected to a second transistor of the second sub-pixel, and a third gate driver connected to a third transistor of the third sub-pixel, the first, second, and third gate drivers being included in a gate driver chain, wherein connecting the second and third pixel electrodes to the data line includes transmitting a first start frame pulse through the gate driver chain at a first time, and transmitting a second start frame pulse through the gate driver chain at a second time, such that the second gate driver receives the first start frame pulse and the third gate driver receives the second start frame pulse concurrently.

20. The non-transitory computer-readable storage medium of claim 18, wherein the display screen includes a first gate driver connected to a first transistor of the first sub-pixel, a second gate driver connected to a second transistor of the second sub-pixel, and a third gate driver connected to a third transistor of the third sub-pixel, the first, second, and third gate drivers being included in a gate driver chain, wherein connecting the second and third pixel electrodes to the data line includes the third gate driver switching on the third transistor in response to receiving a first start frame pulse through the gate driver chain, and the second gate driver switching on the second transistor in response to receiving a second start frame pulse through a transmission path that is in parallel to the gate driver chain.

21. The non-transitory computer-readable storage medium of claim 20, wherein connecting the second and third pixel electrodes to the data line further includes transmitting a single start frame pulse, the single start frame pulse being split into the first start frame pulse on the gate driver chain and the second start frame pulse on the parallel transmission path.

22. The non-transitory computer-readable storage medium of claim 21, wherein the method further comprises applying the first voltage to a third pixel electrode of a third sub-pixel, the second and third sub-pixels being updated in different blocks of update lines in the scanning order, such that the first voltage is applied concurrently to the second and third pixel electrodes.

* * * * *